United States Patent [19]

Tanaka et al.

[11] 4,389,681

[45] Jun. 21, 1983

[54] METHOD AND APPARATUS FOR RECORDING DIGITIZED INFORMATION ON A RECORD MEDIUM

[75] Inventors: Masato Tanaka; Takenori Sonoda; Nobuhiko Watanabe, all of Tokyo, Japan

[73] Assignee: Sony Corporation, Tokyo, Japan

[21] Appl. No.: 286,963

[22] Filed: Jul. 27, 1981

[30] Foreign Application Priority Data

Jul. 26, 1980 [JP] Japan ................................ 55-102853
Jul. 26, 1980 [JP] Japan ................................ 55-102854

[51] Int. Cl.³ ............................ G11B 5/02; G11B 5/09

[52] U.S. Cl. ......................................... 360/27; 360/28; 360/48

[58] Field of Search ........................ 360/27, 28, 39, 40, 360/48, 49, 50

[56] References Cited

U.S. PATENT DOCUMENTS 3,765,005 10/1973 Cannon ................................ 360/48
4,072,987 2/1978 Walker ................................. 360/48
4,121,264 10/1978 Kishi .................................... 360/27
4,279,004 7/1981 Yamashima et al. ................. 360/48

*Primary Examiner*—Vincent P. Canney
*Attorney, Agent, or Firm*—Lewis H. Eslinger; Alvin Sinderbrand

[57] ABSTRACT

At least one channel of digitized information is recorded in a selected number of data tracks by a record medium. The digitized information is encoded, modulated and then recorded in a predetermined number of tracks. For example, if n channels of digitized information are to be recorded in m data tracks, then each channel is recorded in m/n data tracks (m≧n). A control signal is generated to include control data representing at least one of the following: (a) the number of data tracks in which each channel of digitized information is recorded, (b) the encoding scheme used to encode the information, (c) the type of modulation used to modulate the encoded information and (d) the relative speed of movement of the record medium. The control signal is recorded in a separate control track. Thus, the control signal represents the particular format in which the digitized information is recorded.

35 Claims, 19 Drawing Figures

SYNCHRONIZING SIGNAL
4 BITS
CONTROL WORD
16 BITS
C15 C12 C11 C10 C9 C1 C0
SECTOR ADDRESS
28 BITS
S27 S1 S0
CRC CODE
16 BITS
4 BITS 3 BITS 9 BITS
fs DISCRIM.
FORMAT DISCRIM.

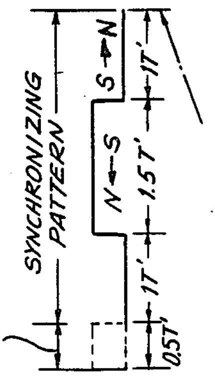
FIG. 2A
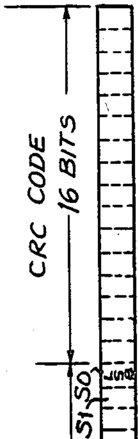
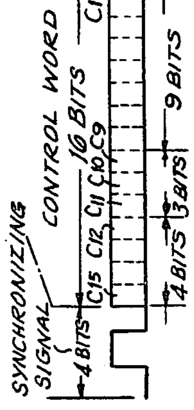
FIG. 2B
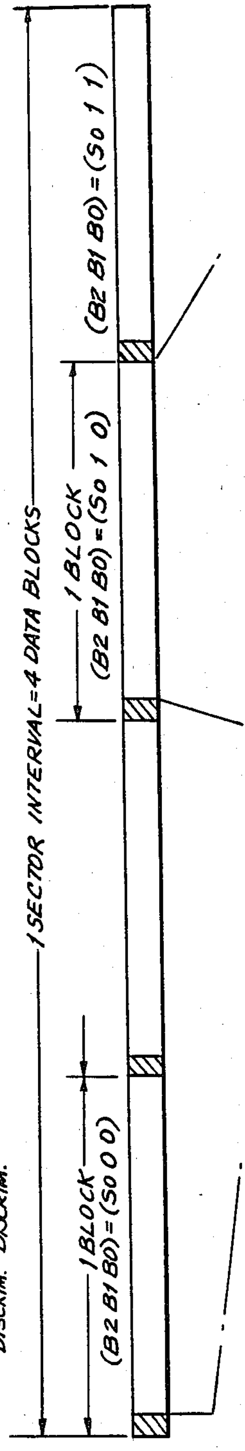
FIG. 2C
DATA SYNCHRONIZING SIGNAL (16 BITS)
FIG. 2D
1.5T 4.5T 4.5T 0.5T $B_2$ $B_1$ $B_0$ $F_{B1}$ $F_{B0}$
FIG. 2E
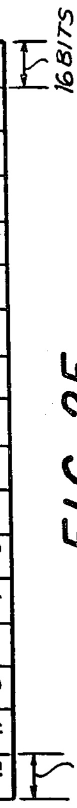
FIG. 2F

FIG. 3A

| | | | | | | | | | | | | | | | | | |
|---|---|---|---|---|---|---|---|---|---|---|---|---|---|---|---|---|---|
| DATA TRACK | DATA SEQUENCE | n | n+1 | n+2 | n+3 | n+4 | n+5 | n+6 | n+7 | n+8 | n+9 | n+10 | n+11 | n+12 | n+13 | n+14 | n+15 |
| | BLOCK ADDRESS | 0 | 1 | 2 | 3 | 4 | 5 | 6 | 7 | 0 | 1 | 2 | 3 | 4 | 5 | 6 | 7 |
| CONTROL TRACK (SECTOR ADDRESS) | | 4m+0 | | | | 4m+1 | | | | 4m+2 | | | | 4m+3 | | | |

FIG. 3B

| | | | | | | | | | | | | | | | | | |
|---|---|---|---|---|---|---|---|---|---|---|---|---|---|---|---|---|---|
| DATA TRACK A | DATA SEQUENCE | n | n+2 | n+4 | n+6 | n+8 | n+10 | n+12 | n+14 | n+16 | n+18 | n+20 | n+22 | n+24 | n+26 | n+28 | n+30 |
| | BLOCK ADDRESS | 0 | 1 | 2 | 3 | 4 | 5 | 6 | 7 | 0 | 1 | 2 | 3 | 4 | 5 | 6 | 7 |
| DATA TRACK B | DATA SEQUENCE | n+1 | n+3 | n+5 | n+7 | n+9 | n+11 | n+13 | n+15 | n+17 | n+19 | n+21 | n+23 | n+25 | n+27 | n+29 | n+31 |
| | BLOCK ADDRESS | 0 | 1 | 2 | 3 | 4 | 5 | 6 | 7 | 0 | 1 | 2 | 3 | 4 | 5 | 6 | 7 |
| CONTROL TRACK (SECTOR ADDRESS) | | 4m+0 | | | | 4m+1 | | | | 4m+2 | | | | 4m+3 | | | |

FIG. 3C

| | | | | | | | | | | | | | | | | | |
|---|---|---|---|---|---|---|---|---|---|---|---|---|---|---|---|---|---|
| DATA TRACK A | DATA SEQUENCE | n | n+4 | n+8 | n+12 | n+16 | n+20 | n+24 | n+28 | n+32 | n+36 | n+40 | n+44 | n+48 | n+52 | n+56 | n+60 |
| | BLOCK ADDRESS | 0 | 1 | 2 | 3 | 4 | 5 | 6 | 7 | 0 | 1 | 2 | 3 | 4 | 5 | 6 | 7 |
| DATA TRACK B | DATA SEQUENCE | n+1 | n+5 | n+9 | n+13 | n+17 | n+21 | n+25 | n+29 | n+33 | n+37 | n+41 | n+45 | n+49 | n+53 | n+57 | n+61 |
| | BLOCK ADDRESS | 0 | 1 | 2 | 3 | 4 | 5 | 6 | 7 | 0 | 1 | 2 | 3 | 4 | 5 | 6 | 7 |
| DATA TRACK C | DATA SEQUENCE | n+2 | n+6 | n+10 | n+14 | n+18 | n+22 | n+26 | n+30 | n+34 | n+38 | n+42 | n+46 | n+50 | n+54 | n+58 | n+62 |
| | BLOCK ADDRESS | 0 | 1 | 2 | 3 | 4 | 5 | 6 | 7 | 0 | 1 | 2 | 3 | 4 | 5 | 6 | 7 |
| DATA TRACK D | DATA SEQUENCE | n+3 | n+7 | n+11 | n+15 | n+19 | n+23 | n+27 | n+31 | n+35 | n+39 | n+43 | n+47 | n+51 | n+55 | n+59 | n+63 |
| | BLOCK ADDRESS | 0 | 1 | 2 | 3 | 4 | 5 | 6 | 7 | 0 | 1 | 2 | 3 | 4 | 5 | 6 | 7 |
| CONTROL TRACK (SECTOR ADDRESS) | | 4m+0 | | | | 4m+1 | | | | 4m+2 | | | | 4m+3 | | | |

DEMULTIPLEXER

METHOD AND APPARATUS FOR RECORDING DIGITIZED INFORMATION ON A RECORD MEDIUM

BACKGROUND OF THE INVENTION

This invention relates to a method and apparatus for recording channels of digitized information in data tracks on a record medium and, more particularly, to such a method and apparatus which is capable of recording such digitized information in a variety of different formats, while enabling common electronic circuitry to recover the recorded information regardless of the recording format which had been used.

Recently, digital recording techniques have been extended to various fields in which analog recording heretofore had been used. For example, high quality audio recording now can be achieved by using digital techniques. So-called PCM recorders have been proposed for recording audio signals in digital form on a suitable magnetic record medium, such as magnetic tape. U.S. Pat. Nos. 4,211,997 and 4,145,683 describe two of these digital audio recording techniques.

In analog audio recording, it is conventional to record the analog audio signals on magnetic tape which may be moved at a selected one of different speeds. It is known that, at higher recording speeds, the overall quality of the audio signal which may be recorded and reproduced is improved; but this improvement is achieved at a cost of relatively higher tape consumption. Thus, it is difficult to obtain long-playing record tapes of easily manageable size.

It is expected that similar considerations are applicable to digital audio recording. That is, digital signals of higher quality may be recorded and reproduced from magnetic media, such as magnetic tape, which are driven at faster speeds. Fortunately, the use of digital techniques provides relatively flexible capabilities of recording the digital signals in various different formats without loss of quality. For example, in one format, a number of channels of information are recorded in respective tracks on, for example, magnetic tape. Such multi-channel recording has long been used in professional analog recording applications, such as the preparation of master analog tapes from which phonograph records, prerecorded tapes, and the like, are produced. If each channel of information is recorded in a separate track, the maximum number of channels will be recorded but it is necessary to drive the tape at a relatively high speed. Thus, tape consumption also is relatively high. Tape speed and, thus, tape consumption, are reduced if each channel of digital signals is recorded in a plurality of tracks. For example, the tape speed may be reduced by one-half if each channel is recorded in two separate tracks, and the tape speed may be reduced by one-half again if each channel now is recorded in four tracks. Aforementioned U.S. Pat. No. 4,211,997 describes a digital audio recording technique wherein one channel is recorded in two separate tracks.

Generally, digital signals which are recorded in one of the aforementioned formats must be reproduced by apparatus which operates in accordance with that particular format. Typically, apparatus that is capable of operating in accordance with one format is not compatible with data that is recorded in a different format. That is, digital signals which are recorded on a magnetic tape in the format of one track per channel usually cannot be reproduced by apparatus designed for the format wherein digital signals are recorded in two (or four) tracks per channel. This lack of compatibility between different formats is a disadvantage of digital audio recorders of the type mentioned hereinabove.

As yet another example of different recording formats, it is typical to encode the digital signal (which may, for example, originate as a PCM signal formed of 16 bits) in one of various different types of error-correcting codes. One recent error correcting code which has been developed and which is particularly useful in recovering digitally encoded signals that may be subject to dropout, burst error, and the like, is the so-called cross-interleave error correction code described in, for example, U.S. application Ser. No. 218,256, filed Dec. 19, 1980. Other error-correction encoding techniques also are known, such as described in U.S. Ser. No. 195,625, filed Oct. 9, 1980. Typically, reproducing and decoding apparatus that is adapted to decode information that has been encoded in accordance with one encoding scheme, such as in accordance with one type of error-correction encoding scheme, generally is not compatible with digital information that has been encoded in a different encoding scheme.

Likewise, the encoded digitized information may be modulated prior to recording. Different types of modulations have been proposed, such as that described in U.S. Pat. No. 222,278, filed Jan. 2, 1981. Reproducing and demodulating apparatus that operates on data which which has been modulated in one format generally is not compatible to demodulate data which has been modulated in accordance with another format.

Accordingly, it is desirable to provide apparatus which is capable of recovering digitized information that has been recorded in various different types of formats. Also, depending upon the particular needs and objectives of the user, it is desirable to provide recording apparatus which is capable of recording digitized information in any one of such different formats.

In multi-channel digital recording/reproducing apparatus, it sometimes is desirable to edit the information in individual channels without affecting or disturbing the information in other channels. Also, the information that has been recorded in one track or in one channel may, at times, be re-recorded in another track or in another channel. Such operations generally are enhanced if information is provided to identify the different signals which are recorded in the different tracks or in different channels. If each channel or each track is provided with suitable identifying signals, a significant amount of redundancy in the useful data tracks must be provided, thereby reducing the available space in which useful information can be recorded. Alternatively, if a separate control track is provided with identifying signals for each of the channels that are recorded on the record medium, then it is thought that such identifying signals must be selectively revised, or rewritten, whenever the information recorded in a corresponding track, or channel, is changed, such as by editing. However, the selective revision of, for example, only one of many identifying signals recorded in a control track is difficult and requires complex circuitry. Furthermore, such selective revisions to the identifying signals raise a strong possibility of producing an error during the signal-rewriting operation.

It is, therefore, desirable to provide a relatively simple technique for identifying the data recorded in each of the separate channels on the record medium.

OBJECTS OF THE INVENTION

Therefore, it is an object of the present invention to provide an improved method and apparatus for recording digitized information that avoids the aforenoted disadvantages.

Another object of this invention is to provide a method and apparatus for recording digital and audio signals on a movable record medium, such as magnetic tape, wherein a plurality of channels are recorded in different tracks.

A further object of this invention is to provide a method and apparatus for recording and reproducing digitized information in different formats, wherein each format is particularly identified and recovered.

An additional object of this invention is to provide apparatus for recording and reproducing digital audio signals in various different formats, and wherein the reproducing apparatus is compatible with those formats.

Yet another object of this invention is to provide a method and apparatus for recording n channels of digitized information in m tracks, wherein each channel is recorded in m/n tracks ($m \geqq n$).

A still further object of this invention is to provide a method and apparatus for recording digitized information in data tracks and for recording a control signal in a separate control track, the control signal including control data representing the particular format in which the digitized information has been recorded, including the number of tracks per channel that has been used for recording the information.

Another object of this invention is to provide a method and apparatus for the PCM recording and reproduction of audio signals, wherein such signals may be recorded in a particular one of various different types of formats, as desired.

Another object of this invention is to provide a method and apparatus for recording digitized information, wherein a control signal is recorded in a separate control track, the control signal representing the particular format used to record the digitized information, as well as identifying the information, thereby facilitating selective editing and re-recording of the various channels of information.

Various other objects, advantages and features of the present invention will become readily apparent from the ensuing detailed description, and the novel features will be particularly pointed out in the appended claims.

SUMMARY OF THE INVENTION

In accordance with this invention, a method and apparatus for recording at least one channel of digitized information in a selected number of data tracks on a record medium are provided. At least one channel of information is encoded into digital form, and the encoded information is modulated and recorded in a predetermined number of data tracks. As one example, if n channels of information are provided, these n channels are recorded in m data tracks, wherein each channel is recorded in m/n data tracks ($m \geqq n$ and m and n are integers). A control signal is generated, the control signal including control data representing at least one of the following: (a) the number of tracks in which each channel of information is recorded, (b) the particular encoding scheme used to encode the information, (c) the particular type of modulation used to modulate the information and (d) the relative speed of movement of the record medium. The control signal is recorded in a separate track on the record medium.

In accordance with one aspect of this invention, the digitized information is derived from analog signals, such as audio signals, which are sampled at a selected sampling rate, each sample then being converted to digital form. The control data included in the control signal also is representative of the sampling rate which has been selected.

Another aspect of this invention is to selectively emphasize the aforementioned analog signal prior to the sampling thereof. An emphasis identification signal is recorded in at least one of the data tracks associated with the channel whose analog signal has been selectively emphasized, the emphasis identification signal representing such selective emphasis of this analog signal. Preferably, if one channel of information is recorded in m/n tracks, the emphasis identification signal is recorded in a predetermined one of those tracks and at a predetermined location therein relative to the digitized information.

In accordance with another feature of the present invention, the signals recorded in the aforementioned manner are reproduced; and the reproduced control signal is used to identify the particular format in which the digitized information is recorded. Thus, regardless of the particular format which has been used, the control data included in the reproduced control signal is employed to recover the original digitized information. It is one aspect of this feature of the invention to multiplex the digitized information reproduced from all of the data tracks in which the digitized information of a respective channel is recorded, in accordance with that portion of the control data which represents the number of data tracks in which that one channel has been recorded.

It is another aspect of this feature of the present invention to utilize the emphasis identification signal which has been recorded in selected data tracks to selectively de-emphasize the analog signals which are derived from the recovered digitized information in each channel.

BRIEF DESCRIPTION OF THE DRAWINGS

The following detailed description, given by way of example, will best be understood in conjunction with the accompanying drawings in which:

FIGS. 2A–2F are timing diagrams representing the various signals that are recorded in the data and control tracks of the record medium by the present invention;

FIGS. 3A–3C are tables which are helpful in understanding the relationship among the different formats with which the present invention is used;

DETAILED DESCRIPTION OF CERTAIN PREFERRED EMBODIMENTS

Figure 1C:
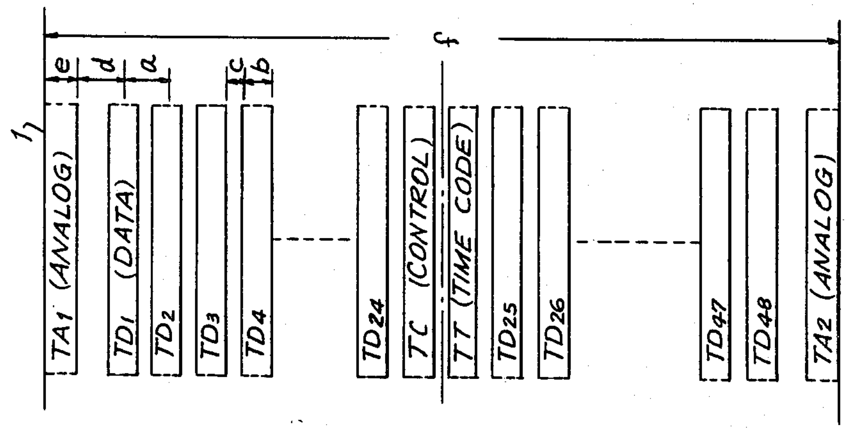
FIGS. 1A–1C are schematic diagrams representing different examples of track patterns which are produced in accordance with the present invention.
Figure 1B:
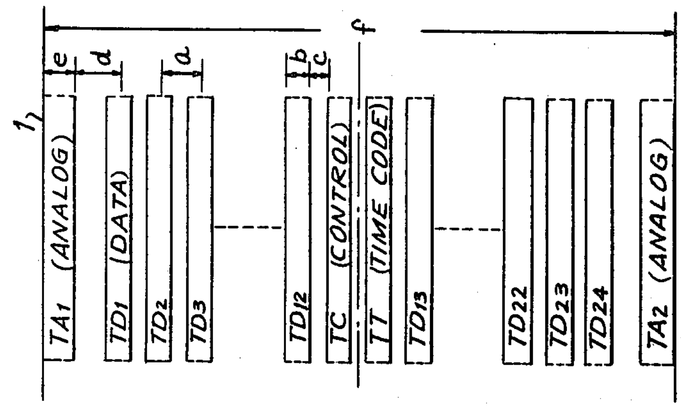
Figure 1A:
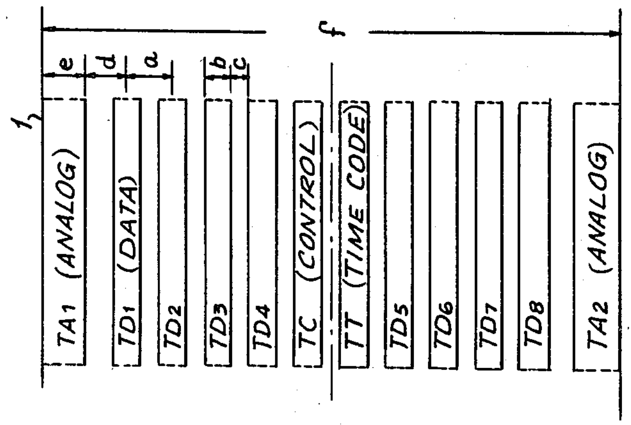

Referring now to the drawings, wherein like reference numerals are used throughout, and in particular to FIGS. 1A–1C, there are illustrated herein three examples of different magnetic tape configurations with which the present invention can be used. It should be readily appreciated from the forthcoming description that this invention can be used to record digitized information on various different types of record media, such as magnetic tape, magnetic disc, magnetic sheet, optical disc, and the like. For the purpose of the present description, it is assumed that the digitized information is recorded on magnetic tape. It is further assumed that this magnetic tape moves with respect to fixed recording and reproducing transducers. Preferably, the recording transducers, or heads, are arranged in an assembly so as to record plural tracks concurrently. These tracks are illustrated in FIG. 1A as being recorded on magnetic tape 1 of, for example, ¼ inch width. FIG. 1B illustrates the tracks which are recorded on magnetic tape of one-half inch width; and FIG. 1C illustrates the tracks which are recorded on magnetic tape of one inch width. As illustrated, the respective tracks are parallel with each other and extend in the longitudinal direction along the magnetic tape.

In FIG. 1A, the ¼ inch tape 1 is illustrated as having marginal tracks $TA_1$ and $TA_2$ adjacent the opposite edges thereof. These marginal tracks are adapted to have analog signals recorded therein. For example, when tape 1 is used to record digital audio signals, analog tracks $TA_1$ and $TA_2$ are used to record analog audio signals. These analog audio signals are useful in locating desired portions of the magnetic tape for use in editing operations, such as so-called splice editing or electronic editing.

Magnetic tape 1 is illustrated as having a center line on either side of which are provided tracks TC and TT. Track TC is a control track adapted to have a control signal recorded therein. This control signal is illustrated in greater detail in FIG. 2B. Track TT is adapted to have a time code recorded therein.

Data tracks $TD_1$, $TD_2$, $TD_3$ and $TD_4$ are disposed, or sandwiched, between analog track $TA_1$ and control track TC. Similarly, data tracks $TD_5$, $TD_6$, $TD_7$ and $TD_8$ are disposed, or sandwiched, between time code track TT and analog track $TA_2$. It will be appreciated that the digitized information is recorded in each of the data tracks TD. In the illustrated example of ¼ inch tape, the digitized information may be recorded in any one of different formats. As an example, and for the purpose of illustration, three separate formats are described herein, these formats being referred to as format A, format B and format C, respectively. As one example thereof, digitized information is recorded in format A in one track per channel. That is, if eight channels of digitized information are provided, these eight channels are recorded in data tracks $TD_1$–$TD_8$, respectively. In format B, the digitized information is recorded in two tracks per channel. That is, since eight data tracks are provided, a total of four channels may be recorded, wherein channel 1 is recorded in tracks $TD_1$ and $TD_5$, channel 2 is recorded in tracks $TD_2$ and $TD_6$, and so on. In format C, the digitized information is recorded in four tracks per channel. Thus, with the eight data track illustrated in FIG. 1, a total of two channels may be recorded. Thus, digital signals from channel 1 are recorded in tracks $TD_1$, $TD_3$, $TD_5$ and $TD_7$; and digital signals from channel 2 are recorded in tracks $TD_2$, $TD_4$, $TD_6$ and $TD_8$. The particular manner in which the digital signals are recorded in the respective tracks is described in greater detail hereinbelow.

In FIG. 1A, the following representations are used for the indicated dimensions:

a=data track pitch;
b=data track width;
c=guard band width separating adjacent data tracks;
d=clearance between adjacent analog and data tracks from the edge of the analog track to the center of the adjacent data track;
e=analog track width; and
f=tape width.

A numerical example of the foregoing dimensions follows:

a=480 μm (microns)
b=280 to 380 μm
c=200 to 100 μm
d=540 μm
e=445 μm
f=

$$6.30\ mm^{+0}_{-20}\ \mu m$$

FIG. 1B illustrates magnetic tape having one-half inch width. As in the FIG. 1A arrangement, tape 1 is provided with a pair of marginally-extending analog tracks $TA_1$ and $TA_2$; and on either side of the center line of the tape is a control track TC and a time code track TT, respectively. Data tracks $TD_1$–$TD_{12}$ are disposed, or sandwiched, between analog track $TA_1$ and control track TC. Similarly, data tracks $TD_{13}$–$TD_{24}$ are disposed, or sandwiched, between time code track TT and analog track $TA_2$. It is seen that, since one-half inch tape 1 (FIG. 1B) is twice the width of the ¼ inch tape shown in FIG. 1A, twice the number of data tracks are provided. Of course, each channel of digitized information may be recorded in a predetermined number of data tracks depending upon the format selected for recording.

Consistent with the foregoing representations of respective dimensions, a numerical example for the illustrated dimensions in FIG. 1B may be as follows:

a=440 μm
b=240 to 340 μm
c=200 to 100 μm
d=500 μm
e=325 μm
f=12.65 mm±10 μm

FIG. 1C illustrates magnetic tape 1 having one inch width. As before, this one inch width tape is provided with a pair of oppositely disposed marginal tracks $TA_1$ and $TA_2$ for recording analog signals therein, and disposed on opposite sides of a center line are control track TC and time code track TT, respectively. Data tracks $TD_1$–$TD_{24}$ are disposed, or sandwiched, between analog track $TA_1$ and control track TC. Data tracks $TD_{25}$–$TD_{48}$ are disposed, or sandwiched, between time code track TT and analog track $TA_2$. It is seen that forty-eight data tracks are provided for the recording of digitized information in the one inch width tape. Here too, each channel is recorded in a predetermined number of data tracks in accordance with the particular format which has been selected for recording that information.

Consistent with the foregoing dimensional representations, one example thereof which can be used to form the 48-track one inch width tape shown in FIG. 1C is as follows:

a=480 μm
b=280 to 380 μm
c=200 to 100 μm
d=540 μm
e=325 μm
f=25.35 mm±10 μm

From the foregoing examples, it is appreciated that, in accordance with one embodiment, the ¼ inch width tape is adapted to record eight data tracks, the one-half inch width magnetic tape is adapted to record 24 data tracks and the one inch width magnetic tape is adapted to record 48 data tracks.

It may be appreciated that, when format A is used such that one track per channel is used for recording, the magnetic tape is advanced at a speed referred to herein as its highest speed. When format B is used such that two tracks per channel are employed for recording, the tape speed may be reduced by half, and this lesser speed is referred to as the medium speed. When format C is used such that four tracks per channel are utilized for recording, the tape speed may be reduced by one-half again, and this is referred to as the slowest tape speed. A numerical example for tape having ¼ inch width is as follows:

| | Format A | Format B | Format C |
|---|---|---|---|
| Number of channels | 8 | 4 | 2 |
| Number of tracks per channel | 1 | 2 | 4 |
| Tape speed (cm/sec) | 76.00 | 38.00 | 19.00 |

It is appreciated that, when more tracks per channel are used, the tape speed may be reduced, thereby reducing tape consumption and enabling so-called long-playing tapes. However, as tape consumption is reduced, thereby increasing the playing time, the number of channels which may be recorded likewise is reduced.

In the foregoing table, the digitized information recorded in the respective data tracks is derived from analog signals, these analog signals being sampled at a predetermined sampling rate and each sample being converted to digital form. As a numerical example, the sampling rate $f_s$ which is used to produce the digitized information is on the order of 50.4 kHz. Other sampling frequencies $f_s$ may be used. It is appreciated that, as other sampling frequencies are employed, the speed at which the tape is driven for recording the digitized information in their respective formats likewise may be reduced. Thus, for a sampling frequency $f_s$ on the order of about 44.1 kHz, the tape speed for ¼ inch tape recording in format A may be on the order of about 66.5 cm/sec. For the sampling frequency $f_s$ on the order of about 32.0 kHz, the tape speed for the ¼ inch tape recording in format A is on the order of about 48.25 cm/sec. Of course, the foregoing tape speeds are halved when format B is adapted, and these tape speeds are halved again when format C is adopted.

It will be explained below that the particular encoding scheme, that is, the code configuration, as well as the type of modulation used for modulating the encoded signal for recording are the same for each of the respective formats, in the presently described embodiment.

Turning now to FIGS. 2A–2F, there are illustrated a typical example of the control signal that is recorded in control track TC and a typical example of the digitized information that is recorded in a typical data track TD. FIG. 2B is a timing diagram representing the control signal; and FIGS. 2C–2F, in combination, are timing diagrams representative of the digitized information.

The control signal having the timing representation shown in FIG. 2B is recorded in control track TC for all formats. This control signal is comprised of a synchronizing signal positioned at the head, or beginning portion thereof, followed by a 16-bit control word formed of control data bits $C_0$–$C_{15}$, followed by a 28-bit sector address formed of address bits $S_0$–$S_{27}$, followed by a 16-bit error detecting code word, such as the cyclic redundancy code (CRC) word. Although the control signal shown in FIG. 2B is comprised of predetermined segments each formed of a preselected number of bits, it will be appreciated that, if desired, other segments may be used; and each of the illustrated segments may be formed of any desired number of bits capable of representing control data, sector addresses and error detecting codes.

The term "sector" or "sector interval", as used herein, refers to a predetermined time interval which corresponds to a predetermined recording length, or interval, on the record medium. The sector interval is defined by the control signal illustrated in FIG. 2B. Successive control signals are recorded in successive, abutting sector intervals. As each control signal is recorded in a sector interval, the sector address is incremented by unity (i.e. by one bit). Hence, the sector address serves to identify the particular sector interval in which the control signal is recorded. The desired sector interval may be accessed merely by addressing the corresponding sector address. It is appreciated that $2^{28}$ successive sector intervals may be recorded on, for example, a length of magnetic tape; and the corresponding sector addresses will be incremented fron one sector interval to the next so as to appear as, for example [0.000 . . . 000], [000 . . . 001], [000. . . 010], [000 . . . 011], and so on. As will be explained below, digitized information is recorded in the respective data tracks TD during each of the successive sector intervals.

The synchronizing signal which precedes the control word is illustrated with an expanded time scale in FIG. 2A. The synchronizing signal occupies a duration equal to four control signal bit cells, wherein a bit cell is equal to the interval occupied by a respective bit of the control word, the sector address and the CRC code. The synchronizing signal is seen to exhibit a predetermined, constant synchronizing pattern preceded by a "preamble". The purpose of the preamble is to accommodate the last, or least significant bit of the CRC code, included in the immediately preceding control signal, so as to ensure that the synchronizing pattern will appear as illustrated. For example, if the last bit of the preceding control signal is a binary "1", which exhibits a relatively higher level, the preamble of the immediately-following synchronizing signal also is at a relatively higher binary "1" level for a duration equal to 0.5 T' (where T' is equal to the bit cell duration of a control signal bit). Conversely, if the last bit of the immediately preceding control signal is a binary "0", which is represented by a relatively lower level signal, the preamble of the next-following synchronizing signal also is equal to a relatively lower binary "0" level for this duration 0.5 T'. Hence, the preamble is seen to exhibit either a first or a second logical sense depending upon the state of the last bit of the immediately preceding control signal.

The synchronizing pattern which is included in the synchronizing signal and which follows the preamble exhibits a positive-going transition at a period 1T' following the preamble, and then exhibits an opposite, negative-going transition at a period 1.5T' following the first-mentioned positive-going transition. The synchronizing signal ends, and the control word commences, at a period 1T' following this second, negative-going transition. This particular synchronizing pattern is advantageous in that it is distinct from any bit pattern included in the control word, sector address or CRC code of the control signal. Hence, this synchronizing pattern may be readily detected during a reproducing operation so as to identify the beginning of successive sector intervals. Also, this synchronizing pattern, when detected, may be used to synchronize the detection of the control word, sector address and CRC code of the control signal, and also may be used in a servo control circuit for controlling the tape drive during a reproducing operation. When the present invention is used with a magnetic recording medium, the transitions in the recorded signal, such as the illustrated transitions which comprise the synchronizing pattern, represent magnetic vectors.

The control word is adapted to represent control data for the purpose of identifying the particular format that is used to record the digitized information. For example, control bits $C_{12}$–$C_{15}$ may represent the sampling rate that has been used to digitize the analog signal, resulting in the digitized information that is recorded. Alternatively, since the speed at which the record medium is driven is related to the sampling rate, control bits $C_{12}$–$C_{15}$ may represent this tape speed. As an example, for the three representative sampling rates mentioned above, control bits $C_{12}$–$C_{15}$, which are referred to herein as the sampling rate identification signal may be as follows:

| Sampling Rate Identification Signal | | | | Sampling Rate (kHz) |
|---|---|---|---|---|
| $C_{15}$ | $C_{14}$ | $C_{13}$ | $C_{12}$ | $f_s$ |
| 0 | 0 | 0 | 0 | 50.4 |
| 0 | 0 | 0 | 1 | 44.1 |
| 0 | 0 | 1 | 0 | 32.0 |

It is seen that, if desired, up to sixteen different sampling rates may be accommodated by the sampling rate identification signal ($C_{12}$–$C_{15}$).

Control bits $C_9$–$C_{11}$ represent the number of tracks per channel in which each channel of digitized information is recorded. From the description set out hereinabove, it is recalled that in format A, each channel of digitized information is recorded in a respective data track. In format B, each channel of digitized information is recorded in two separate data tracks. In format C, each channel of digitized information is recorded in four separate data tracks. The number of tracks per channel may be represented by control bits $C_9$–$C_{11}$ as follows:

| $C_{11}$ | $C_{10}$ | $C_9$ | Tracks/Channel | Format |
|---|---|---|---|---|
| 0 | 0 | 0 | 1 | A |
| 0 | 0 | 1 | 2 | B |
| 0 | 1 | 0 | 4 | C |

It is appreciated that a total of eight different format characteristics, including the number of tracks per channel, may be represented by the 3-bit code $C_9$–$C_{11}$. For purposes of illustration, and in the interest of simplification and brevity, only three such characteristics (i.e. tracks per channel) are illustrated.

Control bits $C_0$–$C_8$ are used to represent other elements which constitute respective formats. For example, different encoding schemes may be used to encode the digitized information. Such encoding schemes include the aforementioned cross-interleave code. Modifications of the cross-interleave code also may be used, as desired. Furthermore, an encoding scheme which is adapted to minimize distortion due to the DC component of the digital signals recorded on the record medium also may be used, such as described in U.S. Ser. No. 201,781, filed Oct. 29, 1980, the disclosure thereof being incorporated herein by reference. Other examples of interleaved error correction encoding techniques are described in, for example, U.S. Ser. Nos. 218,256, filed Dec. 19, 1980, 195,625 filed Oct. 9, 1980, 230,395, filed Feb. 2, 1981 and 237,487, filed Feb, 23, 1981, the disclosures of which being incorporated herein by reference.

In addition to being encoded in a desired encoding scheme, which encoding scheme is represented by selected ones of data bits $C_0$–$C_9$, the encoded digitized information also may be modulated prior to recording. One example of a type of modulation that may be used is described in application Ser. No. 222,278, filed Jan. 2, 1981, the disclosure of which is incorporated herein by reference. In this modulator, the encoded digital signals are modulated so as to establish strict limitations on the minimum and maximum intervals between successive transitions, thereby avoiding distortion when the digitized signals are reproduced. Of course, other types of modulation may be used, such as the so-called 3PM type, or MFM type, or bi-phase modulation, as desired. The particular type of modulation which is used is represented by selected ones of control bits $C_0$14 $C_9$.

Thus, it is appreciated that the control data comprised of bits $C_0$–$C_{15}$ represent the particular format which is used to sample, encode, modulate and record the input information.

The sector address comprised of bits $S_0$–$S_{27}$ may be generated by, for example, a typical counter that is incremented in synchronism with the processing and recording of each sector interval. Preferably, the control data and the sector address data are used to produce an appropriate CRC code, or other error detecting code, from which the presence of an error in the control word and/or sector address may be detected upon reproduction. The formation of a CRC code and the manner in which it is used are known to those of ordinary skill in the art and, in the interest of brevity, further description thereof is not provided.

As will be described below, the control signal illustrated in FIG. 2B is subjected to FM modulation, and the FM-modulated control signal then is recorded in control track TC. Thus, regardless of the particular format which is used to record the digitized information, the FM-modulated control signal described hereinabove is common to such different formats.

FIG. 2C is a representative timing diagram illustrating the manner in which digitized information is recorded in a respective data track TD. For simplification, reference is made initially to the recording of digitized information in one track per channel. In accordance with the aforementioned cross-interleave error correction encoding techniques, successive samples of an input analog signal, such as an audio signal, are converted to corresponding digital information words, and these digital information words are used to produce error-correction words, such as parity words P. Then, a predetermined number of information words and parity words are time-interleaved to form sub-blocks, and a further error-correction word, such as a Q-parity word, is derived from the time-interleaved sub-block. Odd and even information words and their respective P-parity and Q-parity words are cross-interleaved to form a data block comprising, for example, twelve information words, four parity words and an error-detection word, such as a CRC code word, derived therefrom. A respective data block is preceded by a data synchronizing signal and, as illustrated in FIG. 2C, four successive data blocks are recorded in a sector interval. Of course, the data blocks may be modulated prior to recording, as described above.

When format A is used, wherein the digitized information is recorded in one track per channel, successive data blocks are recorded in seriatum in a corresponding data track TD. When the digitized information is recorded in format B, wherein two tracks per channel are used, each of these two data tracks is provided with successive data blocks as shown in FIG. 2C. However, such recorded data blocks need not necessarily be sequential blocks. For example, the first data block may be recorded in block position #1 of a first of the two tracks, and the second data block may be recorded in block position #1 in the second data track. Then, the third data block may be recorded in block position #2 in the first track and the fourth data block may be recorded in block position #2 in the second data track. This distribution of data blocks may continue such that, for example, in the first data track, data blocks 1, 3, 5, 7 and so on are recorded; and in the second data track, data blocks 2, 4, 6, 8 and so on are recorded.

If format C is selected, wherein four tracks per channel are used for recording, the first data block is recorded in block position #1 of a first data track, the second data block is recorded in block position #1 of a second data track, the third data block is recorded in block position #1 of a third data track, and the fourth data block is recorded in block position #1 of the fourth data track. Then, the fifth data block is recorded in block position #2 of the first data track, the sixth data block is recorded in block position #2 of the second data track, the seventh data block is recorded in block position #2 of the third data track and the eighth data block is recorded in block position #2 of the fourth data track. Hence, the first data track has recorded therein the data blocks of sequence 1, 5, 9, 13, and so on; the second data track has recorded therein the sequence of data blocks 2, 6, 10, 14, and so on; the third data track has recorded therein the sequence of data blocks 3, 7, 11, 15 and so on; and the fourth data track has recorded therein the sequence of data blocks 4, 8, 12, 16 and so.

Nevertheless, regardless of the particular format, or number of tracks per channel which is used, each data track has succeeding data blocks recorded therein in the manner shown in FIG. 2C. Thus, during each sector interval, four succeeding data blocks are recorded, each data block being preceded by a data synchronizing signal. Advantageously, the control signal recording head is in proper alignment with the information signal recording heads such that all of the data tracks are in alignment across the width of the magnetic medium, that is, all of the data synchronizing signals are in alignment, and the information signals also are in alignment with the control signal recorded in control track TC. That is, the synchronizing signal which is recorded at the head of the control signal is in alignment with the data synchronizing signals of each of the first data blocks recorded in a particular sector interval. Alternatively, the control signal recording head may be displaced from the information signal recording heads by a distance equal to an integral multiple of a sector interval.

The data synchronizing signal which precedes each data block (shown by the cross-hatched areas in FIG. 2C) is illustrated with an expanded time scale in FIGS. 2D and 2E. The data synchronizing signal occupies an interval corresponding to sixteen data bit cells, wherein each data bit cell is equal to the duration of the recorded data bit. It should be appreciated that the duration of a data bit cell T is much smaller than the duration of a control bit cell T', for example, T'=18T. The data synchronizing signal includes a synchronizing pattern comprised of a first transition which occurs at an interval 1.5T following the beginning of the data synchronizing signal, a second transition which occurs at an interval 4.5T following the first transition, and a third transition which occurs at an interval 4.5T following the second transition. Since the data synchronizing signal of one data block follows immediately after the last bit of the preceding data block, the synchronizing pattern may exhibit the waveform shown either in FIG. 2D or 2E, depending upon the logic signal level of the final bit of the preceding data block.

The data synchronizing pattern is selected to be unique in that this pattern will not be exhibited by the information data included in the respective data blocks, even after modulation. For example, if the modulation described in U.S. Ser. No. 222,278 is adopted, transitions between data bits of the modulated digitized information are prohibited from exhibiting the pattern shown in FIGS. 2D and 2E. Consequently, the data synchronizing signal may be readily detected upon reproduction and used, for example, to restore timing, to detect the beginning of a data block, to synchronize the demodulation and decoding of the digitized information, and the like.

The data synchronizing pattern is followed, after a delay interval of 0.5T, by a block address comprised of bits $B_0$–$B_2$ which, in turn, is followed by flag bits $F_{B1}$ and $F_{B0}$. The block address $[B_2B_1B_0]$ identifies the particular block position in which the data block is recorded. Preferably, the most significant bit $B_2$ of the block address is made equal to the least significant bit $S_O$ of the sector address of the particular sector in which the data block is recorded. Since the block address is comprised of three bits, it is appreciated that eight separate block positions may be represented thereby. Since four data blocks are recorded in a sector interval, and since the most significant block address bit $B_2$ is made equal to the least significant sector address bit $S_0$, it is appreciated that the block address $[B_2B_1B_0]$ is repeated every two sector intervals. That is, eight separate block positions are recorded during every two sector intervals. If the most significant block address bit $B_2$ is equal to a binary "1", as determined by the least significant sector address bit $S_O$, then the data synchronizing signal shown in FIG. 2B is recorded. Alternatively, if the most significant block address bit $B_2$ is equal to a binary "0", then the data synchronizing signal illustrated in FIG. 2E is recorded.

Flag bits $F_{B1}$ and $F_{B0}$ are used, in the preferred embodiment of the present invention, as an emphasis identification signal. Preferably, when the present invention is used to record digital audio signals, the original analog audio signals are selectively subjected to emphasis prior to being digitized. If such analog signals are emphasized, that is, if a conventional emphasis circuit is actuated or "turned on", then the emphasis identification signal represents that the analog signal had been emphasized. For example, $[F_{B1}F_{B0}]=[01]$. Alternatively, if the input analog signals had not been emphasized, then the emphasis identification signal may be represented as $[F_{B1}F_{B0}]=[00]$.

Typically, emphasis will occur over a sufficient duration such that all of the digitized signals from a particular channel which are recorded in two sector intervals will be emphasized. It is, therefore, not necessary to record the emphasis identification signal in each data block. Preferably, therefore, the emphasis identification signal is recorded only when the block address $[B_2B_1B_0]$ is equal to [000]. Furthermore, if the digitized information is recorded in two tracks per channel, the emphasis identification signal may be recorded only in one of such two tracks, and as before, this emphasis identification signal is recorded only when the block address in that particular track is equal to [000]. Likewise, when the digitized information is recorded in four tracks per channel, the emphasis identification signal may be recorded in only a predetermined one of those tracks and, again, only when the block address in that track is equal to [000]. Consequently, flag bits $F_{B1}$ and $F_{B0}$ may be used to represent other information, or format data, as desired, when the block address is other than [000].

While the foregoing has described the recording of the emphasis identification signal in only a predetermined one track even if the digitized information is recorded in two tracks per channel or four tracks per channel, it should be appreciated that, if the emphasis duration of the input analog signals is less than the duration equal to 16 data blocks (when two tracks per channel are used) or less than the duration equal to 32 data blocks (when four tracks per channel are used), the emphasis identification signal then may be recorded in additional tracks associated with this channel. It may be stated in general, therefore, that the emphasis identification signal is recorded in at least one of the data tracks in which a channel of information signal is recorded. Furthermore, although the emphasis identification signal hass been described herein as being recorded in the first data block of, for example, even-numbered sector intervals ($S_O$="0"), the emphasis identification signal may, if desired, be recorded in the first data block in odd-numbered sector intervals ($S_O$="1").

As illustrated in FIGS. 2D and 2E, the data synchronizing signal interval is equal to a 16-bit interval which, in turn, corresponds to an information (or parity) word duration.

The information portion of each data block is illustrated with an expanded time scale in FIG. 2F. Information words $W_1$–$W_{12}$ each is formed as a 16-bit word, and each is derived from a respective sample of the input analog signal. In addition to the information words $W_1$–$W_{12}$, each data block also includes odd and even parity words $P_O$ and $P_E$, respectively, and odd and even Q-parity words $Q_O$ and $Q_E$, respectively. The odd and even information and parity words are cross-interleaved in accordance with the techniques described in the above-referenced, incorporated patent applications. In addition, an error detecting word, such as a 16-bit CRC code word, is produced in response to the information and parity words, and also in response to the block address bits $B_0$–$B_2$ and the flag bits $F_{B0}$ and $F_{B1}$.

It will be appreciated that information words $W_1$–$W_{12}$ all are derived from the same channel. Odd-numbered and even-numbered information words are separated, and the respective parity words $P_O$, $P_E$ and $Q_O$, $Q_E$ are derived from such separated information words. For example, odd parity word $P_O$ is produced in response to the six odd-numbered information words $W_1, W_3 \ldots W_{11}$; and even parity word $P_E$ is produced in response to the six even-numbered information words $W_2, W_6 \ldots W_{12}$. The odd-numbered information and parity words are time-interleaved, and the odd parity word $Q_O$ is produced therefrom. Likewise, the even-numbered information and parity words are time-interleaved, and the even parity word $Q_E$ is produced therefrom. Then, all of the these time-interleaved odd and even words are cross-interleaved to form the illustrated data block. Preferably, the parity words are positioned in the central section of the data block, and successive odd-numbered(and even-numbered) information words are spaced from each other by a maximum distance. Thus, successive odd-numbered information words $W_1$ and $W_3$ are seen to be separated by the maximum distance which can be accommodated by the data block. Likewise, successive even-numbered information words $W_2$ and $W_4$ are separated by this maximum distance. This cross-interleaved error correction encoding technique facilitates the correction of what otherwise would be considered to be "uncorrectable" errors wherein successive information words are obliterated. Since there is a low probability that, for example, information words $W_1$ and $W_3$ both will be obliterated, when only one of these words is erroneous, it may be derived by interpolation techniques from the non-erroneous information words.

From the aforementioned patent application, it will be appreciated that information words $W_1$ and $W_2$, for example, do not correspond to adjacent samples of the input analog signal. Such adjacent samples may be represented by information words that are recorded in widely separated data blocks. This is an advantageous feature of the aforementioned cross-interleave error correction encoding technique.

FIGS. 3A–3C illustrate the relationship among the recording formats A, B and C, respectively, wherein each channel of digitized information is recorded in one data track (format A), in two data tracks (format B) or in four data tracks (format C). Thus, in format A, as shown in FIG. 3A, successive data blocks are recorded in a single data track. In format B, as shown in FIG. 3B, successive data blocks are distributed alternately between tracks A and B. In format C, successive data blocks of a single channel are distributed, sequentially, in data tracks A, B, C and D. This distribution of data blocks in respective data tracks will be described in greater detail hereinbelow.

In FIGS. 3A–3C, the expression "data sequence" refers to the successive data blocks included in a particular channel, and the expression "block address" refers to the block # in which that particular data block is recorded in a respective data track. Furthermore, the expression "n" and "m", as used in FIGS. 3A–3C, are integers. Accordingly, it is seen that, when format A is adopted, the first data block (n) is recorded in block #0 of, for example, the first sector interval. The second data block (n+1) is recorded in block #1 of this sector interval, and so on. In the second sector interval (4m+1), the fifth data block (n+4) is recorded in block #4, the sixth data block (n+5) is recorded in block #5, and so on. At the next following sector interval (4m+2), the block addresses are seen to repeat.

When format B is adopted, the first data block (n) is recorded in block #0 of track A in the first sector interval (4m+0), and the second data block (n+1) is recorded in block #0 of track B in this sector interval. The third data block (n+2) is recorded in block #1 of track A in this sector interval, and the fourth data block (n+3) is recorded in block #1 of track B in this sector interval. This distribution of data blocks continues such that, in block #0, 1, 2, 3, 4, 5, 6 and 7 of track A, data blocks n, n+2, n+4, n+6, n+8, n+10, n+12, and n+14 are recorded; and in block #0, 1, 2, 3, 4, 5, 6 and 7 in track B data blocks n+1, n+3, n+5, n+7, n+9, n+11, n+13 and n+15 are recorded. It is seen that these block addresses repeat at the commencement of sector interval 4m+2.

When format C is adopted, as shown in FIG. 3C, the successive data blocks are distributed in tracks A, B, C and D. Thus, the first data block (n) is recorded in block #0 of track A, the second data block (n+1) is recorded in block #0 of track B, the third data block (n+2) is recorded in block #0 of track C and the fourth data block (n+3) is recorded in block #0 of track D. This sequence of data block distributions continues, so as to record the data blocks in respective block numbers of tracks A–D, respectively, as illustrated. Upon the occurrence of sector interval 4m+2, the block addresses in each of tracks A–D repeat.

The foregoing may be summarized, when the record medium is, for example, ¼ inch width tape, as follows:

| Data Track | Format A | Format B | Format C |
|---|---|---|---|
| $TD_1$ | CH1 | CH1-A | CH1-A |
| $TD_2$ | CH2 | CH2-A | CH2-A |
| $TD_3$ | CH3 | CH3-A | CH1-C |
| $TD_4$ | CH4 | CH4-A | CH2-C |
| $TD_5$ | CH5 | CH1-B | CH1-B |
| $TD_6$ | CH6 | CH2-B | CH2-B |
| $TD_7$ | CH7 | CH3-B | CH1-D |
| $TD_8$ | CH8 | CH4-B | CH2-D |

In the foregoing, it is seen that, when format B is adopted, the first data block (A) for channel 1 (CH1) is recorded in data track $TD_1$, and the second data block (B) of channel 1 (CH1) is recorded in data track $TD_5$. A similar distribution occurs for channels 2–4.

When format C is adopted, the first data block (A) of channel 1 (CH1) is recorded in data track $TD_1$, the second data block (B) of channel 1 (CH1) is recorded in data track $TD_5$, the third data block (C) of channel 1 (CH1) is recorded in data track $TD_3$, and the fourth data block (D) of channel 1 (CH1) is recorded in data track $TD_7$. A similar distribution of successive data blocks A, B, C and D for channel 2 is recorded in data tracks $TD_2$, $TD_6$, $TD_4$ and $TD_8$, respectively.

The foregoing track assignments advantageously simplify the manner in which data is distributed or recovered for the different formats which may be used.

Figure 4:
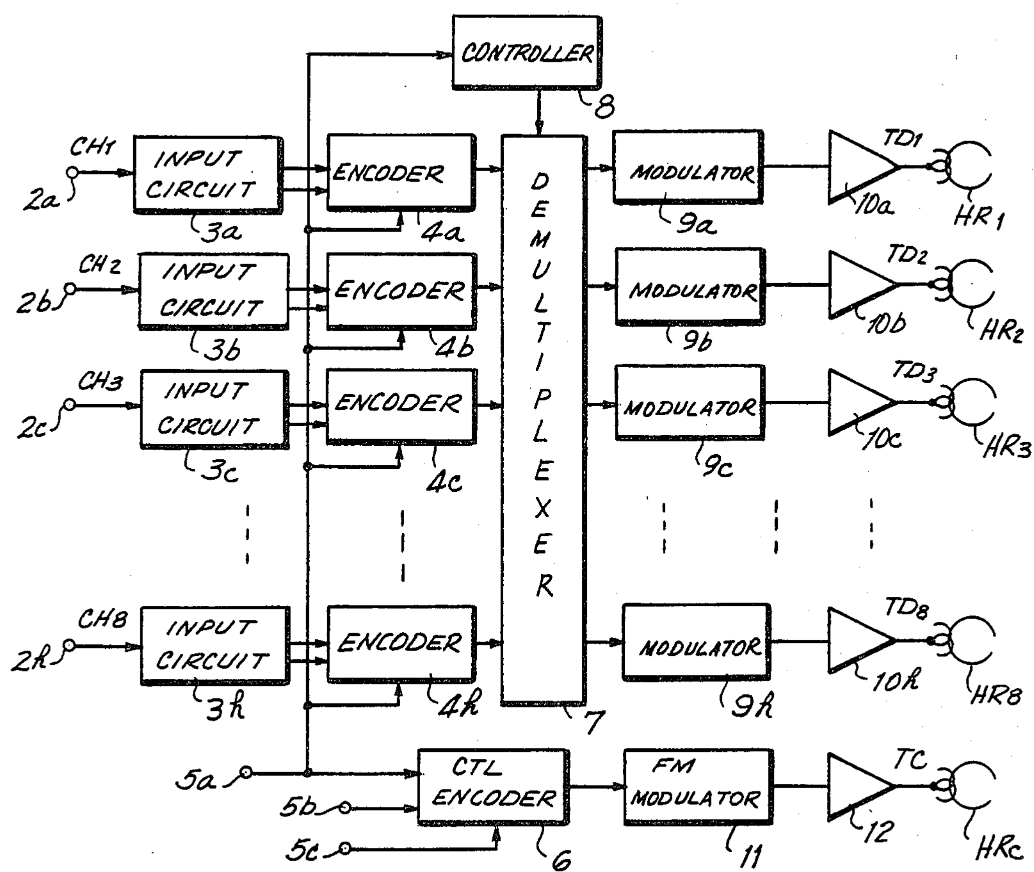
FIG. 4 is a block diagram of one embodiment of the recording section of the present invention.

Turning now to FIG. 4, there is illustrated a block diagram of one embodiment of the apparatus used, in accordance with the present invention, to record digitized information in a selected one of various different formats. This digitized information may represent digital audio signals, such as PCM audio signals, which have been converted into digital form in accordance with a selected sampling rate $f_s$, and which have been selectively emphasized in accordance with a conventional emphasis circuit. In the interest of simplification, the embodiment of FIG. 4 is illustrated for use with ¼ width tape. Nevertheless, the following description is equally applicable to recording apparatus for use with ½ width tape or for use with one inch width tape, as will be appreciated.

For use with ¼ inch width tape, the illustrated recording apparatus is adpated to receive up to eight channels of digitized information, and to record the received channels of information in respective data tracks. As mentioned above, the number of tracks in which each channel of information is recorded is dependent upon the selected format. Accordingly, the illustrated apparatus is provided with eight input terminals *2a . . . 2h*, each adapted to receive a respective channel of digitized information CH1 . . . CH8, respectively. Input terminals *2a–2h* are coupled to input circuits *3a–3h*, respectively. As will be described below, the digitized information included in each of channels CH1–CH8 is comprised of an information word, such as a 16-bit PCM word representing a corresponding sample of the original analog (e.g. audio) signal, and eight additional bits which may be used, inter alia, to indicate if the original analog signal had been emphasized. The input circuit, such as input circuit *3a*, is adapted to establish a desired clocktime for the digitized information, and also to provide a separate emphasis identification signal in response to the aforementioned additional bits.

The clocked digitized information, as well as the emphasis identification signal, produced by each of input circuits *3a–3h* are coupled to encoders *4a–4h*, respectively. Each encoder may be of the cross-interleaved error correction type described hereinabove or, alternatively, the encoders may be adapted to encode the digitized information in other error correction encoding schemes. Each encoder may be operable in accordance with different formats such that a particular encoding scheme is adopted in accordance with a format identifying signal supplied thereto. For this purpose, an additional input terminal *5a* is provided to receive a format control signal which may be generated by, for example, an operator of the illustrated apparatus.

In order to simplify the present description, it is assumed that only one type of encoding scheme is used, such as the aforementioned cross-interleaved error correction code. Thus, regardless of the format which is selected, this same encoding scheme will be employed to encode each channel of digitized information. However, the present invention contemplates the use of different encoding schemes to accommodate different formats. The particular encoding scheme which is selected, that is, the partcular mode of operation of the illustrated encoders, is dependent upon the format control signal supplied to such encoders from input terminal 5*a*.

The encoded digitized information produced by encoders 4*a*–4*h* are supplied to respective inputs of a demultiplexor 7. This demultiplexor is described in greater detail hereinbelow with respect to FIG. 6. Suffice it to say, for the present description, that demultiplexor 7 is adapted to distribute the digitized information supplied to the respective inputs thereof to preselected outputs, depending upon the particular format which has been selected. In this regard, demultiplexor 7 is coupled to a controller 8 which, in turn, is coupled to input terminal 5*a* to receive the format control signal.

As will be explained, the demultiplexor includes a set of switching circuits, the operation of which is controlled by controller 8. For example, if the format control signal supplied to input terminal 5*a* identifies format A, controller 8 controls the switching circuits of demultiplexor 7 such that the digitized information supplied to each input of the demultiplexor from encoders 4*a*–4*h*, respectively, is coupled to a corresponding respective output. That is, each channel of digitized information is distributed to only a single output of demultiplexor 7. If, however, the format control signal supplied to input terminal 5*a* identifies format B, controller 8 controls demultiplexor 7 to distribute each channel of digitized information supplied to a respective input to two outputs. In this regard, only four channels (CH1–CH4) of digitized information are supplied to the illustrated recording apparatus. Each channel is distributed to two respective outputs of the demultiplexor in accordance with the foregoing table. Likewise, if the format control signal supplied to input terminal 5*a* identified format C, controller 8 controls the switching circuits of demultiplexor 7 such that each channel of digitized input information supplied to the demultiplexor is distributed to four respective outputs. When format C is adopted, it is appreciated that only two channels (CH1 and CH2) of digitized information are supplied to the illustrated recording apparatus. Demultiplexor 7 is controlled so as to distribute these channels of digitized information in the manner summarized by the foregoing table.

In the foregoing description it should be recognized that the digitized information supplied to each input of demultiplexor 7 is encoded in, preferably, the cross-interleaved error correction code by encoders 4*a*–4*h*, respectively. Thus, a particular input of the demultiplexor is supplied with consecutive data blocks of the type shown in FIG. 2F, each data block having been formed in the manner described in the aforementioned, incorporated patent applications.

The outputs of demultiplexor 7, which also may be referred to as a distributor circuit, are coupled to modulators 9*a*–9*h*, respectively. Each modulator may be of the type described in aforementioned application Ser. No. 222,278. Although not shown herein, each modulator alternatively may be adapted to operate in different modes of operation so as to carry out different types of modulation. The particular type of modulation which is adopted is dependent on and controlled by the format control signal supplied to input terminal 5*a*. Thus, depending upon the particular format which is adopted by the operator, a corresponding type of modulation is effected.

The outputs of modulators 9*a*–9*h* are coupled to data recording heads HR1–HR8 via recording amplifiers 10*a*–10*h* to be recorded in data tracks $TD_1$–$TD_8$, respectively. Thus, each received channel of digitized information is recorded in the selected format on, for example, magnetic tape. That is, a selected encoding scheme, type of modulation, tape speed and number of tracks per channel are adopted in accordance with the particular format which is used.

FIG. 4 also illustrates a control channel whereby the control signal shown in FIG. 2B is produced, modulated and recorded in a separate control track TC. The control channel is coupled to input terminal 5*a* and also to additional input terminals 5*b* and 5*c*. Input terminal 5*b* is adapted to receive a sampling identification signal which identifies, or represents, the particular sampling rate $f_s$ which has been used to digitize the original input analog information. Input terminal 5*c* is adapted to receive an appropriate clock signal for synchronizing the operation of the control channel. These input terminals 5*a*, 5*b* and 5*c* are connected to the control signal encoder 6 which, for example, includes a control word generator responsive to the format control signal and the sampling identification signal to produce the aforementioned control word comprised of control bits $C_0$–$C_{15}$. The control signal encoder also includes a synchronizing signal generator for generating the preamble and synchronizing pattern shown in FIG. 2A in response to the clock signal supplied to input terminal 5*c*. In addition, the control signal encoder includes a sector address generator which, for example, may include a multi-bit binary counter. Also included in control signal encoder 6 is a CRC word generator which may be of a conventional type and which is supplied with the generated control word and sector address to produce an appropriate CRC word.

The control signal produced by control encoder 6. which may be of the type shown in FIG. 2B, is coupled to control recording head $HR_C$ via an FM modulator 11 and a recording amplifier 12. It is preferred to record the control signal as a frequency-modulated signal so as to facilitate the reproduction and detection thereof for all formats. That is, even though the tape speed may differ from one format to another, the frequency-modulated control signal may, nevertheless, be accurately detected.

Figure 5:
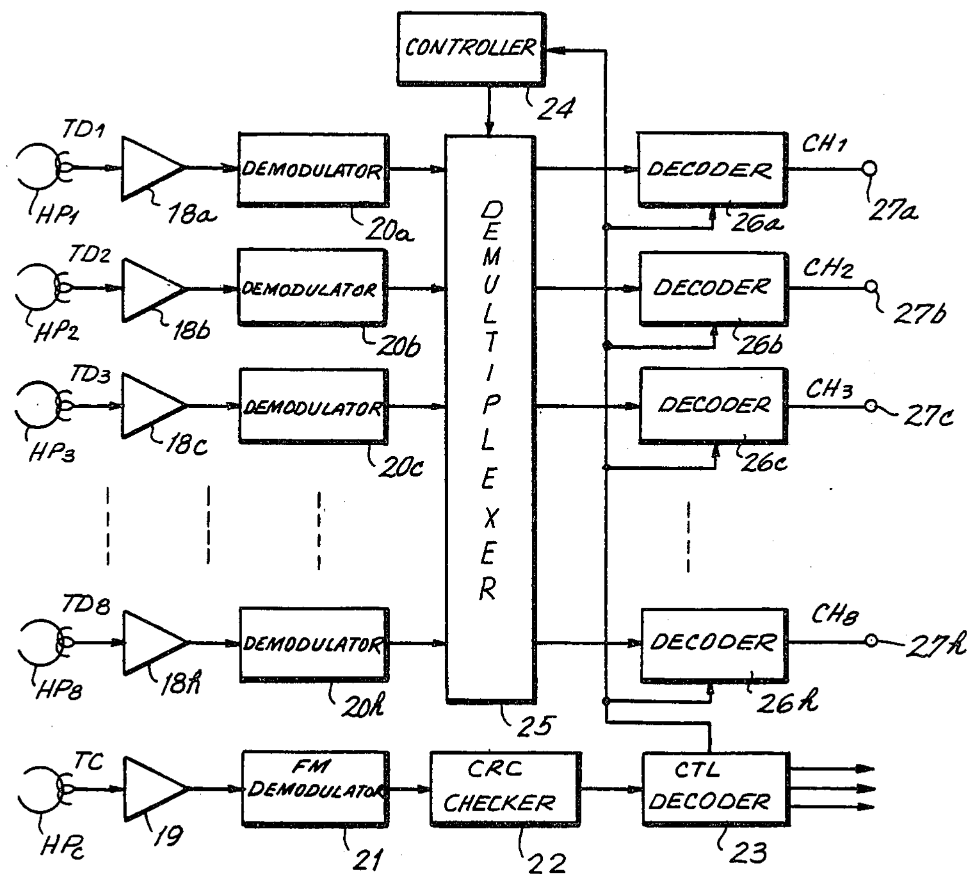
FIG. 5 is a block diagram of one embodiment of the reproducing section of the present invention.

Before describing the reproducing apparatus shown in FIG. 5, which apparatus is adapted to reproduce the digitized information recorded in the respective data tracks, as well as the control signal recorded in the control track, and to recover therefrom the original digitized information regardless of the particular format which has been adopted, additional description now is provided for particular ones of the elements shown in FIG. 4. In particular, demultiplexor 7 is illustrated in greater detail in FIG. 6.

As shown, the demultiplexor is provided with input terminals 13*a*–13*h* adapted to receive the digitized information of channels CH1–CH8, respectively, as supplied thereto by encoders 4*a*–4*h*. Each input terminal is coupled to a respective switching circuit 15*a*–15*h*. These switching circuits are schematically illustrated as electro-mechanical switches having a movable contact selectively engageable with one of a plurality of fixed contacts. It will be appreciated, however, that in a preferred embodiment each of the switching circuits is comprised of a solid-state switching device which may be of conventional construction. Also, although not shown herein, each switching circuit is adapted to be controlled by controller 8 such that the movable contact thereof selects a corresponding fixed contact in accordance with the format control signal supplied to the controller. Switching circuits **15*a*–15*h* include fixed contacts a–h, respectively, these fixed contacts being coupled to outputs 14*a*–14*h* and thence, through modulators 9*a*–9*h*, amplifiers 10*a*–10*h*** and recording head $HR_1$–$HR_8$, respectively, so as to record digitized information in data tracks $TD_1$–$TD_8$, respectively.

Switching circuit **15*a* also includes fixed contacts a, c and g coupled to outputs 14*a*, 14*c* and 14*g*, respectively. Likewise, switching circuit 15*b* also includes fixed contacts f, d and h coupled to outputs to 14*f*, 14*d* and 14*h*, respectively. Switching circuit 15*c* includes an additional fixed contact g coupled to output 14*g*; and switching circuit 15*d* includes additional fixed contact h to output 14*h*. All of switching circuits 15*c*–15*h*** also include an additional fixed contact i which, as schematically illustrated, is electrically isolated from their respective outputs.

In operation, when format A is selected, the appropriate format control signal is supplied to controller 8 which, in turn, couples the movable contacts of switching circuits **15*a*–15*h* to their fixed contacts a, b, c, d, e, f, g and h, respectively. Hence, each channel of digitized information that is supplied to inputs 13*a*–13*h* is coupled to a respective one of outputs 14*a*–14*h***. That is, each data block of channel $CH_1$ is recorded in data track $TD_1$, each data block of channel $CH_2$ is recorded in data track $TD_2$, each data block of channel $CH_3$ is recorded in data track $TD_3$, and so on.

When format B is selected, controller 8 controls the switching circuits such that the movable contacts of switching circuits **15*e*–15*h* remain engaged with their fixed contacts i. The movable contacts of switching circuits 15*a*–15*d*, however, alternate, at each data block interval, between their first two fixed contacts. That is, the movable contact of switching circuit 15*a* alternates between fixed contacts a and e at successive data block intervals. Likewise, the movable contact of switching circuit 15*b* alternates between fixed contacts b and f; the movable contact of switching circuit 15*c* alternates between fixed contacts c and g; and the movable contact of switching circuit 15*d* alternates between fixed contacts d and h. Thus, successive data blocks included in channel 1 are distributed to outputs 14*a* and 14*e* so as to be recorded in data tracks $TD_1$ and $TD_5$. Likewise, the successive data blocks included in channel 2 are distributed, alternately, to outputs 14*b* and 14*f* for recording in data tracks $TD_2$ and $TD_6$. Successive data blocks included in channel 3 are distributed, alternately, to outputs 14*c* and 14*g* for recording in data tracks $TD_3$ and $TD_7$; and successive data blocks in channel 4 are distributed, alternately, to outputs 14*d* and 14*h*** for recording in data tracks $TD_4$ and $TD_8$. Thus, the recording format shown in FIG. 3B is effected.

When format C is selected, controller 8 controls demultiplexor 7 such that the movable contacts of all of switching circuits **15*c*–15*h* remain engaged with their fixed contact i. The movable contact of switching circuit 15*a* is stepped, at consecutive data block intervals, to fixed contacts a, e, c, g and then back to a. Likewise, the movable contact of switching circuit 15*b* is stepped, at successive data block intervals, to fixed contacts b, f, d, h and then back to b. Thus, when format C is adopted, successive data blocks included in channel 1 are distributed to outputs 14*a*, 14*e*, 14*c* and 14*g*, respectively, for recording in data tracks $TD_1$, $TD_5$, $TD_3$ and $TD_7$. Concurrently therewith, successive data blocks included in channel 2 are distributed to outputs 14*b*, 14*f*, 14*d* and 14*h*, respectively, for recording in data tracks $TD_2$, $TD_6$, $TD_4$ and $TD_8$. Thus, demultiplexor 7** effects the recording arrangement shown in FIG. 3C.

Figure 7:
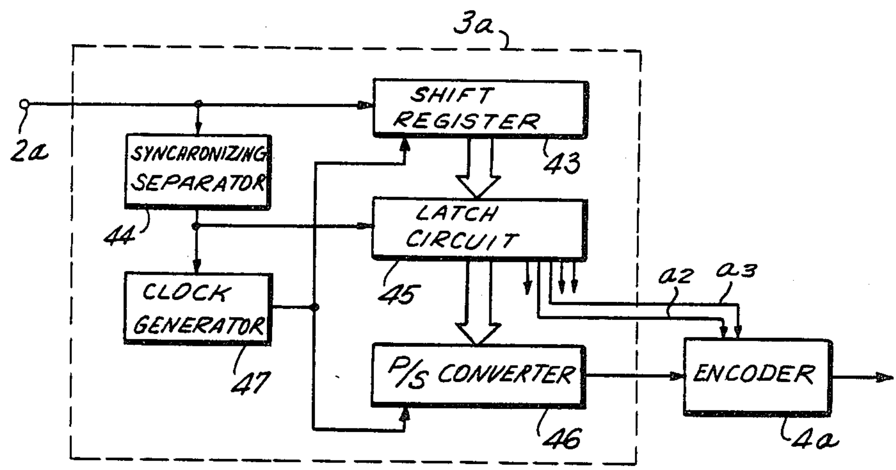
FIG. 7 is a block diagram of an input circuit of the type used in the embodiment of FIG. 4.

In FIG. 4, input circuits **3*a*–3*h* may be of similar construction. One embodiment of input circuit 3*a* which may be used with the present invention is shown in FIG. 7. As illustrated, input terminal 2*a* is coupled to a shift register 43 and, in addition, to a synchronizing signal separator 44. Input terminal 2*a* is supplied with digitized information which, for example, may be successive PCM words derived from successive samples of a channel of analog signals. A typical configuration of the PCM word which may be supplied to input terminal 2*a* illustrated in FIG. 8. As shown, this PCM word may be formed as, for example, a 24-bit digital word comprised of 16 bits representing the amplitude of the analog sample, referred to in FIG. 8 as PCM data, and eight additional bits comprised of, for example, five control bits $a_0$–$a_4$ and a 3-bit synchronizing signal $b_0$–$b_2$. The 3-bit synchronizing signal may exhibit a particular bit pattern so as to be readily detected by synchronizing separator 44**. Control bits $a_0$–$a_4$ may be used for various control functions, and two of these control bits $a_2$ and $a_3$ are adapted to indicate whether the original input analog signal has been emphasized. The remaining control bits may be used, for example, as a page flag, or to indicate whether dubbing should be carried out, and the like.

Figure 8:
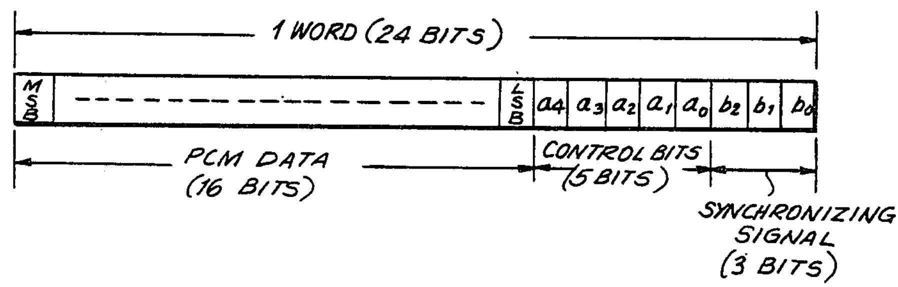
FIG. 8 is a timing diagram illustrating a typical digital signal that is supplied to the recording section shown in FIG. 4.

Synchronizing signal separator 44 is adapted to detect the 3-bit synchronizing signal shown in FIG. 8, and to synchronize a clock generator 47 therewith. Hence, the clock generator is synchronized with the rate at which the PCM words (shown in FIG. 8) are supplied to input terminal **2*a*. The clock signal produced by clock generator 47 is coupled to shift register 43 and, in addition, to a parallel-to-serial converter 46. Shift register 43 thus is adapted to be synchronized by clock generator 47 so as to receive the successive bits included in the digital signal supplied thereto from input terminal 2*a***.

When shift register 43 is fully loaded, that is, when all twenty-four bits of the PCM word shown in FIG. 8 are stored therein, the contents of the shift register are transferred, in parallel, to a latch circuit 45. This latch circuit is synchronized with the rate at which the digital signal is supplied to input terminal **2*a* and loaded into shift register 43 by means of synchronizing signal separator 44. For example, if synchronizing bit $b_0$ (FIG. 8) is the last bit transmitted to input terminal 2*a*, this bit may be detected by synchronizing signal separator 44 to supply a latch, or load, pulse to latch circuit 45**, whereupon the contents of the shift register are loaded into the latch circuit. Although not shown therein, there may be no need to retain the 3-bit synchronizing signal ($b_0$–$b_2$) and, optionally, this synchronizing signal might not be latched in the latch circuit.

The 16-bit PCM word stored in latch circuit 45 is serialized by parallel-to-serial converter 46 at a desired read-out clock rate under the control of clock generator 47. This serialized digital signal is supplied bit-by-bit to encoder **4*a*. In addition, the emphasis identification bits $a_2$and $a_3$, stored in latch circuit 45, also are supplied to encoder 4*a***.

Although not shown herein, encoder **4*a* (as well as encoders 4*b*–4*h*) includes a synchronizing pattern generator to generate the data synchronizing pattern shown in FIGS. 2D and 2E, a block address generator for generating the block address ($B_2B_1B_0$) for each data block transferred thereto from parallel-to-serial converter 46, an emphasis identification generator responsive to emphasis bits $a_2$ and $a_3$ for generating the emphasis identification signal $FB_1FB_0$, described above, as well as circuitry for encoding the digital signals supplied thereto in the cross-interleaved code containing interleaved parity words and a CRC code word, such as described in the aforementioned incorporated patent applications. Thus, encoder 4***a* produces the data blocks shown in FIGS. 2C–2F.

Although not shown in FIGS. 4 or 7, it is appreciated that the timing of the encoders is a function of the particular format which has been adopted. In this regard, a suitable timing control circuit, including an adjustable clock generator, may be provided in each encoder, the operation of each timing control circuit being controlled, or changed over, in response to the format control signal supplied to input terminal 5*a* of FIG. 4. Thus, proper timing of the encoded digitized information is achieved so as to be consistent with the selected format.

Referring now to FIG. 5, there is illustrated a block diagram of reproducing apparatus for reproducing the digitized information from respective tracks of the record medium, which apparatus is compatible with any one of the particular formats which may be used to record that information. For simplification, the illustrated reproducing apparatus is adapted to be used with ¼ inch width tape. Hence, the data reproducing apparatus is comprised of reproducing heads $HP_1$–$HP_8$ adapted to reproduce the digitized information which had been recorded in data tracks $TD_1$–$TD_8$, respectively. Heads $HB_1$–$HB_8$ are coupled to demodulators 20*a*–20*h* via playback amplifiers 18*a*–18*h*, respectively. Each demodulator is adapted to be compatible with the particular type of modulation which had been used to record the digitized information. Consequently, each demodulator may include selectable demodulator circuitry responsive to a format identification signal (such as represented by control bits $C_0$–$C_{15}$ of the recorded control signal) to select the appropriate demodulating circuitry.

Demodulators 20*a*–20*h* are coupled to respective inputs of a multiplexor 25, this multiplexor being, for example, a complement of the demultiplexor described hereinabove with respect to the embodiment shown in FIG. 6. Demultiplexor 25 is controlled by a suitable controller 24, this controller being responsive to a decoded format identification signal for establishing the appropriate switching sequences for the multiplexor. The outputs of multiplexor 25 are coupled to decoders 26*a*–26*h*, respectively, which decoders may be of the type described in the aforementioned incorporated patent applications adapted to decode, for example, the preferred cross-interleaved error correction code which had been used to record the digitized information. The outputs of decoders 26*a*–26*h* are coupled to output terminals 27*a*–27*h*, respectively, so as to recover the original channels of digitized information CH1–CH8, respectively.

The reproducing apparatus shown in FIG. 5 also includes a control channel adapted to recover the control signal (FIG. 2B) which had been recorded in control track TC. In this regard, the control channel includes a control reproducing head $HP_C$ coupled to an FM demodulator 21 via a playback amplifier 19. The FM demodulator is adapted to demodulate the control signal which had been frequency modulated prior to recording. This demodulated control signal then is supplied to an error-detecting circuit 22, such as a CRC check circuit, which operates in a known manner in response to the CRC code word included in the control signal for the purpose of detecting whether an error is present in the control signal. That is, CRC check circuit 22 detects whether the control word $C_0$–$C_{15}$ or the sector address $S_0$–$S_{27}$ contains an error. If no error is detected, the control signal is supplied to a decoder 23 which operates to recover the control word ($C_0$–$C_{15}$), the sector address and the synchronizing pattern included in the control signal. However, if an error is detected in the reproduced control signal, an immediately preceding control word, which had been stored to account for the possibility that the next-following control signal may be erroneous, is used. In this regard, a delay circuit having a time delay equal to one sector interval may be provided in, for example, decoder 23.

The recovered control word ($C_0$–$C_{15}$) is supplied to controller 24 to establish the particular switching arrangement by which the digitized information which is reproduced from data tracks $TD_1$–$TD_8$ is re-distributed, or re-formed, back to the proper channels. This control word also is supplied to decoders 26*a*–26*h* to select the appropriate decoding scheme which is compatible with the particular encoding scheme which had been used for recording the digitized information. Also, depending upon the number of tracks per channel which had been used for recording, the timing control of the decoders may be adjusted to be compatible therewith, the number of tracks per channel being represented, of course, at least by control bits $C_9$–$C_{11}$. Also, the sampling identification data, comprised of bits $C_{12}$–$C_{15}$, may be used by digital-to-analog circuitry (not shown) so as to recover the original analog signal in each channel.

Figure 6:
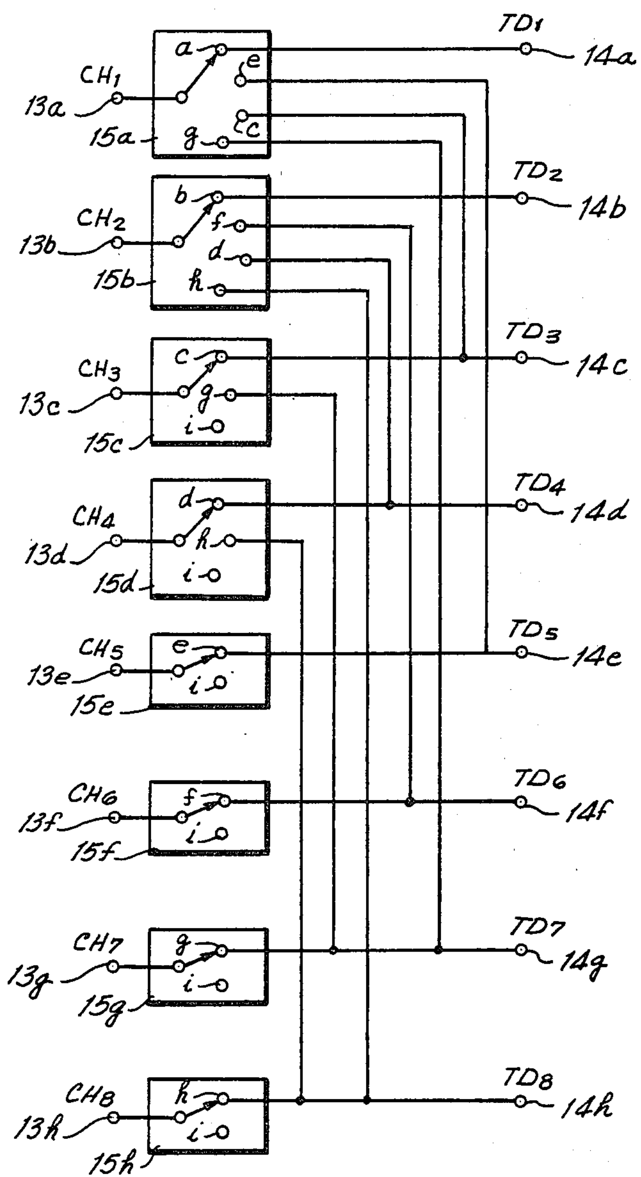
FIG. 6 is a schematic diagram of a demultiplexer which can be used with the embodiment of FIG. 4 and, with modifications, can be used as a multiplexer with the embodiment of FIG. 5.

As one example of multiplexor 25, the demultiplexor shown in FIG. 6 may be used wherein the reproduced, demodulated digitized information is supplied to respective ones of terminals 14*a*–14*h*, and switching circuits 15*a*–15*h* are selectively operated so as to recover the respective channels of digitized information at terminals 13*a*–13*h*. These channels of digitized information then are supplied to decoders 26*a*–26*h*, respectively, to recover the original digital signals, such as the PCM words. When the apparatus shown in FIG. 6 is used as multiplexor 25, the movable contacts of all of switching circuits 15*a*–15*h* engage the uppermost one of their respective fixed contacts when format A is used. It is appreciated that controller 24 is supplied with control bits $C_9$–$C_{11}$ from control decoder 23 to detect the particular format with which the digitized information had been recorded. When the format identifying signal ($C_9$–$C_{11}$) represents format A, controller 24 controls switching circuits 15*a*–15*h* accordingly.

Alternatively, when format B is detected, the movable contact in each of switching circuits 15*e*–15*h* is disposed to engage fixed contact i. Then, the movable contacts of switching circuits 15*a*–15*d* are switched alternately between the illustrated two uppermost fixed contacts therein. Consequently, the two tracks in which each channel of digitized information is recorded now is redistributed to four separate channels CH1–CH4, respectively.

When format C is detected, the movable contacts of all of switching circuits 15*c*–15*h* are disposed in engagement with fixed contact i. The movable contacts of switching circuits 15a–15b are stepped, in sequence, from one to the next of the illustrated fixed contacts. Thus, the four tracks in which each channel of digitized information is recorded are re-distributed back to a respective channel, thereby recovering channels CH1 and CH2.

Preferably, the reproducing apparatus illustrated in FIG. 5 recovers the original digitized information, which information then is supplied to suitable converting circuitry for converting the digital signals back to their original analog form. For example, if the illustrated apparatus is used as a so-called PCM audio recorder, the digitized information produced at the outputs of decoders 26a–26h is in the form of PCM signals, and each PCM signal is converted into a corresponding analog level so as to re-form the original analog audio signal. One embodiment of suitable converting circuitry which may be coupled to a respective one of output terminals 27a–27h is illustrated in FIG. 9.

Figure 9:
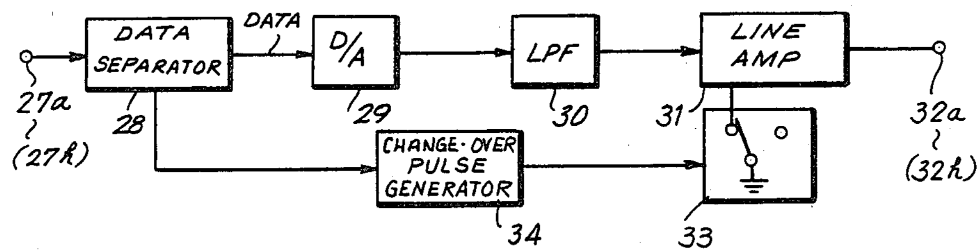
FIG. 9 is a block diagram of one embodiment of apparatus which can be used to recover the original analog signals from the digitized information reproduced by the embodiment shown in FIG. 5.

The converting circuitry of FIG. 9 is comprised of a data separator circuit 28, a digital-to-analog converter 29. a low pass filter 30 and a line amplifier 31. The line amplifier is adapted to carry out a de-emphasis operation selectively. The output of lime amplifier 31 is coupled to an output terminal 32a.

Data separator 28 is supplied with digital signals from, for example, decoder 26a. This digital signal includes the block address and emphasis identification signal ($FB_1FB_0$) which is positioned at the head of each data block, as shown in FIGS. 2C–2F. The purpose of the data separator is to separate the digital signal information, that is, the PCM word representing the analog signal level, from the composite digital signal. The separated PCM word is converted back to analog form by digital-to-analog converter 29; and this analog signal then is filtered and amplified by filter 30 and line amplifier 31, respectively.

The separated block address and emphasis identification signals are supplied, by data separator 28, to a change-over pulse generator 34. This change-over pulse generator is adapted to detect when the block address [$B_2B_1B_0$] is equal to [000], and then to sense the flag bits [$FB_1FB_0$] which constitute the emphasis identification signal. Based upon this detected emphasis identification signal, a selector switch 33 is selectively operated to actuate or deactuate the de-emphasis circuit included in line amplifier 31. It is appreciated, therefore, that when the flag bits $FB_1FB_0$ following a block address [$B_2B_1B_0$]=[000] and [00], then a change-over pulse is supplied to switching circuit 33 so as to deactuate the de-emphasis circuit. Alternatively, if the flag bits $FB_1FB_0$ following the block address [$B_2B_1B_0$]=[000] are [00], the change-over pulse now supplied to switching circuit 33 tends to actuate the de-emphasis circuit. Consequently, depending upon the emphasis identification signal which has been produced and recorded, de-emphasis is selectively carried out.

It is appreciated that the converting circuit illustrated in FIG. 9 represents one such converting circuit coupled, for example, to output terminal 27a of decoder 26a. Other similar converting circuits should be coupled to output terminals 27b–27h, respectively, in order to recover the analog signals of channels $CH_2$–$CH_8$, respectively.

The foregoing description of FIGS. 4–9 has, for simplification, assumed that the record medium with which the present invention is used is magnetic tape of ¼ inch width. It should be readily appreciated that the present invention is equally usable with magnetic tape of ½ inch width and with magnetic tape of one inch width. For example, if ½ inch width magnetic tape is used, the information recorded in the respective data tracks is as shown in FIG. 3B. The recorded data may be summarized as follows:

| Data Track | Format A | Format B |
|---|---|---|
| n | CH(n) | CH(n)-A |
| n + 6 | CH(n+6) | CH(n+6)-A |
| n + 12 | CH(n+12) | CH(n)-B |
| n + 18 | CH(n+18) | CH(n+6)-B |

In the foregoing table, "n" is assumed to be an integer from 1 to 6.

When the present invention is used with tape of one inch width, such as shown in FIG. 1C, the digitized information is distributed among the respective tracks in accordance with the following table:

| Data Track | Format A | Format B |
|---|---|---|
| n | CH(n) | CH(n)-A |
| n + 12 | CH(n+12) | CH(n+12)-A |
| n + 24 | CH(n+24) | CH(n)-B |
| n + 36 | CH(n+36) | CH(n+12)-B |

In the preceding table, "n" is an integer from 1 to 12.

Also, in both of the preceding tables, it should be recognized that, in format B, the designation "-A" and "-B" refers to the first and second data blocks of a given channel.

Figure 10:
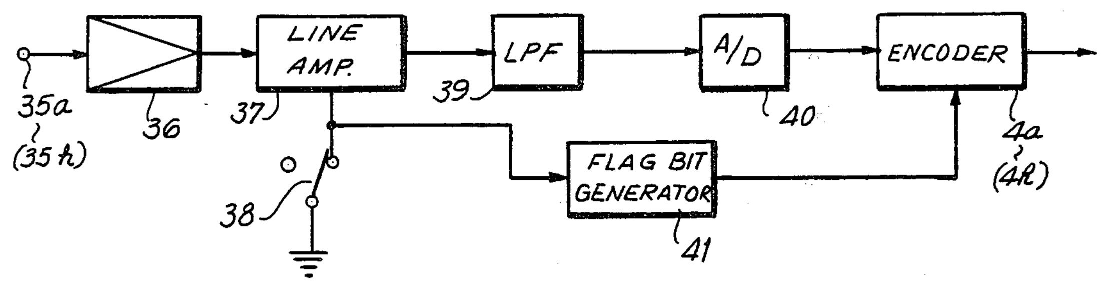
FIG. 10 is a block diagram of one embodiment of apparatus which can be used to convert analog signals to digitized information, for use with the recording section shown in FIG. 4.

In the embodiment shown in FIG. 4, the digitized information supplied to input terminals 2a–2h is assumed to be derived from PCM modulators including analog-to-digital converting apparatus. Preferably, such analog-to-digital converting apparatus also includes an input amplifier having an emphasis circuit which is selectively operable in accordance with known emphasis techniques. One embodiment of suitable converting circuitry for supplying encoder 4a with digitized information is illustrated in FIG. 10. It will be appreciated that similar converting circuitry is provided for respective ones of encoders 4b–4h as well.

FIG. 10 includes an input terminal 35a coupled to an amplifier 36, the output of which is supplied via a line amplifier 37 and low-pass filter 39 to an analog-to-digital converter 40. Line amplifier 37 includes a selectively operable pre-emphasis circuit which may be of known type. This pre-emphasis circuit is actuated, or turned ON, when switch 38 is closed, that is, when this switch is disposed in the illustrated condition. The closing of switch 38 is detected by a flag bit generator 41 which is adapted to produce the aforementioned flag bits $FB_1FB_0$ depending upon whether the input analog signal has been emphasized prior to analog-to-digital conversion.

The flag bits $FB_1FB_0$ produced by flag bit generator 41 have been referred to hereinabove as the emphasis identification signal. As mentioned previously, if the digitized information of a particular channel is recorded in two or more data tracks (e.g. two tracks per channel for format B and four tracks per channel for format C), the emphasis identification signal need be recorded in only one of these plural data tracks.

From FIG. 10, it is seen that the digitized information produced by analog-to-digital converter 40, which may comprise PCM data words, differential PCM data words, or the like, are combined with the emphasis identification signal in encoder 4a. Furthermore, this encoder may be of the type described in the aforementioned patent applications, which have been incorporated herein by reference, to produce the preferred cross-interleaved error correction code.

While the present invention has been particularly shown and described with reference to certain preferred embodiments, it will be readily appreciated by those of ordinary skill in the art that various changes and modifications in form and details may be made without departing from the spirit and scope of the invention. For example, the various tape speeds may be changed from the particular numerical examples discussed above. For instance, when format C is adopted, the tape speed may be on the order to about 38 cm/sec. Alternatively, when format A is adopted, the tape speed may be on the order of about 38 cm/sec. Also, and as has been mentioned above, various different encoding techniques may be used so as to obtain different code configurations from the cross-interleaved error correction code discussed above. Likewise, the type of modulation used may differ from that described in U.S. Ser. No. 222,278.

Nevertheless, it should be appreciated from the present invention that common electric circuitry, which preferably is constructed in the form of electronic circuit boards, may be used to accommodate different formats. Hence, an operator may select a desired format which satisfies certain optimum conditions, and the particular format which is adopted may be readily detected, demodulated, decoded and recovered, in accordance with the present invention. The present invention also enables various editing techniques to be used successfully, such as editing techniques of the type described in U.S. Ser. No. 116,408, filed Jan. 29, 1980, and in U.S. Ser. No. 195,625, filed Oct. 9, 1980.

It is intended that the appended claims be interpreted as including the foregoing as well as various other changes and modifications.

What is claimed is:

1. A method of recording at least one channel of digitized information signal in a selected number of data tracks on a record medium comprising the steps of:

providing a format control signal;

encoding at least one channel of an information signal into digital form;

modulating the encoded information signal;

recording the at least one channel of modulated, encoded information signal in a predetermined number of data tracks on said record medium;

at least one of said steps of encoding, modulating and recording being selectively controlled in accordance with said format control signal;

generating a control signal including control data responsive to said format control signal representing at least one of the following: (a) the number of tracks in which each channel or modulated, encoded information signal is recorded, (b) the encoding scheme used to encode said information signal, and (c) the type of modulation used to modulate said encoded signal; and recording said control signal in a separate control track on said record medium.

2. The method of claim 1 wherein said step of recording the information signal comprises recording successive data blocks in each data track, each data block including a plurality of digital information words and at least one parity word, a predetermined number of data blocks in a data track being equal to a sector interval; and wherein said step of recording the control signal comprises recording respective control signals in respective sector intervals.

3. The method of claim 1 wherein said step of generating a control signal additionally comprises generating a control signal error detecting code derived from said control data, said control signal error detecting code being included as part of said control signal.

4. The method of claim 2 wherein said information signal is an analog signal and said step of encoding includes sampling said analog signal at a selected sampling rate; and wherein said control data represents both the number of tracks in which each channel of modulated, encoded information signal is recorded and said selected sampling rate.

5. The method of claim 4 wherein said step of encoding includes selectively emphasizing said analog signal prior to sampling thereof; and wherein said step of recording the information signal comprises recording an emphasis identification signal in at least one of the data tracks in which said at least one channel of information signal is recorded, said emphasis identification signal representing the selective emphasis of said analog signal.

6. The method of claim 5 wherein said emphasis identification signal is recorded in at least one data track in a predetermined data block during certain sector intervals.

7. The method of claim 2 wherein said step of recording the information signal additionally comprises generating a predetermined synchronizing pattern; and recording said synchronizing pattern with each data block.

8. The method of claim 2 wherein said step of generating a control signal further comprises generating a predetermined synchronizing waveform; generating a preamble signal of a first logical sense if the control signal of an immediately preceding sector terminates at a first signal level and generating said preamble signal of a second logical sense if said control signal of said immediately preceding sector terminates at a second signal level; and recording said preamble signal followed by said synchronizing waveform as the beginning portion of said control signal in each sector interval.

9. A method of recording n channels of analog signals as digital signals in m data tracks on a record medium, wherein each channel is recorded in m/n data tracks ($m \geqq n$ and m and n are integers) comprising the steps of:

providing a format control signal;

encoding each channel of analog signals into a channel of corresponding digital signals by sampling each channel of analog signals at a samplilng rate and converting each sample into an encoded digital signal in accordance with a pre-selected encoding scheme;

modulating the encoded digital signals in accordance with a pre-selected type of modulation;

recording each channel of encoded, modulated digital signals in successive data blocks in m/n data tracks, each data block being comprised of plural information words derived from plural samples of said analog signal and at least one error correcting word, and a predetermined number of data blocks being recorded in a respective track within a sector interval;

at least one of said steps of encoding, modulating and recording being pre-selected in accordance with said format control signal;

generating a control signal including control data responsive to said format control signal representing at least one of the following: (a) the number of data tracks per channel in which said encoded digital signals are recorded, (b) the pre-selected encoding scheme used for encoding each channel, and (c) the pre-selected type of modulation used for modulating each channel; and recording said control signals in a separate control track within said sector interval.

10. The method of claim 9 wherein said step of generating a control signal includes generating an error detecting code as a function of said control data; and recording said error detecting code as part of said control signal, whereby an error in said control data may be detected upon reproduction thereof.

11. The method of claim 9 wherein said step of encoding further includes selectively emphasizing respective channels of said analog signals; generating respective emphasis identification signals representing said selective emphasizing; and recording a respective one of each of said emphasis identification signals in at least one the m/n data tracks in which a respective channel of digital signals is recorded.

12. The method of claim 11 wherein each emphasis identification signal is recorded in a predetermined data block in each channel.

13. The method of claim 11 wherein each emphasis identification signal is recorded in a predetermined data block during predetermined sector intervals in a predetermined one of said m/n data tracks.

14. The method of claim 11 wherein said step of recording each channel of digital signals further comprises generating a synchronizing pattern; and recording said synchronizing pattern in each data block.

15. A method of recovering at least one channel of digitized information that has been encoded, modulated and recorded in at least one data track on a record medium in accordance with a selected one of plural formats; and wherein a control track also has been recorded on said record medium containing a control signal which includes format data representing at least one of the following: (a) the number of data tracks in which said at least one channel of digitized information has been recorded, (b) the encoding scheme in which said digitized information has been encoded, and (c) the type of modulation with which said digitized information has been modulated, said method comprising the steps of reproducing said at least one channel of digitized information from said at least one data track; reproducing said control signal from said control track; recovering said format data from the reproduced control signal; and utilizing the recovered format data to recover the original digitized information regardless of the particular format in which the digitized information had been recorded.

16. The method of claim 15 wherein said digitized information and said control signal are reproduced concurrently from said at least one data track and from said control track, respectively.

17. The method of claim 15 wherein each data track contains successive data blocks, each formed of at least a plurality of information words and at least one error correcting word, a predetermined number of said recorded data blocks comprising a sector interval; and wherein said control track contains successive control signals recorded in successive sector intervals, respectively.

18. The method of claim 15 wherein said step of utilizing the format data to recover the original digitized information includes multiplexing the digitized information reproduced from all of the data tracks in which the digitized information of a respective one channel is recorded, in accordance with the format data representing the number of data tracks in which said one channel of digitized information has been recorded.

19. The method of claim 15 wherein said digitized information represents analog signals, and wherein at least one data track in which the digitized information of a respective channel is recorded also contains emphasis identification data identifying whether the analog signal represented by said digitized information had been emphasized; and further comprising the steps of converting the recovered original digitized information to corresponding analog signals, reproducing said emphasis identification data, and selectively de-emphasizing the converted analog signals in accordance with said reproduced emphasis identification data.

20. Apparatus for recording at least one channel of digitized information in a selected number of data tracks on a movable record medium, comprising:

format means for establishing a selected one of plural formats for said digitized information, said format including a particular encoding scheme, type of modulation, speed of movement of said record medium and number of data tracks per channel for said digitized information;

control signal generating means for generating a control signal including control data representing the format established for said digitized information;

data recording means for recording said at least one channel of digitized information in said selected number of data tracks on said record medium; and control recording means for recording said control signal in a separate control track on said record medium.

21. The apparatus of claim 20 wherein said format means is operative to form successive data blocks comprised of plural data words and at least one error correcting word for each data track, said data recording means being operative to record successive data blocks in each of said selected number of data tracks, and said control recording means being operative to record said control signal in successive sector intervals; and wherein a predetermined number of data blocks are recorded in a sector interval.

22. The apparatus of claim 10 wherein said control signal generating means includes error detecting code generating means for generating an error detecting code in response to at least said control data; and wherein said control recording means is operative to record said error detecting code, whereby an error in said control data is detected upon reproduction of said control signal.

23. The apparatus of claim 20 wherein each channel of digitized information represents a corresponding channel of analog signals; and wherein said format means includes digital-to-analog converting means for sampling said channel of analog signals at a selected one of plural sampling rates and for converting each sample to a digital representation; and wherein said control signal generating means for generating a sampling rate identification signal as part of said control data for identifying said selected sampling rate.

24. The apparatus of claim 23 wherein said digital-to-analog converting means includes emphasis means selectively operative to emphasize said channel of analog signals, and means for generating an emphasis identification signal to identify if said channel of analog signals has been emphasized; and wherein said data recording means is operative to record said emphasis identification signal in at least one of said selected number of data tracks.

25. The apparatus of claim 20 wherein said format means includes demultiplexer means having respective inputs connected to receive respective channels of said digitized information, outputs coupled to said data recording means, and switching means selectively operative to couple a respective input to successive predetermined ones of said outputs for establishing the number of data tracks per channel for said digitized information.

26. The apparatus of claim 20 further comprising data reproducing means for reproducing the digitized information recorded in respective data tracks; control reproducing means for reproducing the control signal from said control track; and recovery means responsive to said control data for recovering the original channels of digitized information.

27. The apparatus of claim 26 wherein each channel of digitized information represents a corresponding channel of analog signals; and said format means includes emphasis means selectively operative to emphasize said channel of analog signals, and means for generating an emphasis identification signal to identify if said channel of analog signals has been emphasized, said emphasis identification signal being recorded in at least one of said selected number of data tracks; and wherein said recovery means includes digital-to-analog converting means for converting each channel of digitized information to a corresponding channel of analog signals, and de-emphasis means responsive to the reproduced emphasis identification signal for said channel to selectively de-emphasize said analog signals.

28. The apparatus of claim 26 wherein said recovery means includes multiplexing means having respective data inputs coupled to receive the digitized information reproduced from said respective data tracks, outputs for providing the respective channels of said digitized information, and switching means selectively operative to couple a respective output to successive predetermined ones of said inputs in response to said reproduced control signal, thereby re-forming said respective channels of digitized information.

29. Apparatus for reproducing n channels of digitized information from m data tracks on a movable record medium, wherein each channel is recorded in m/n data tracks ($m \geqq n$ and m and n are integers), and wherein a control signal is recorded in a separate control track, said control signal including control data representing the format of said recorded digitized information, said format including a particular encoding scheme, type of modulation, speed of movement of said record medium and number of data tracks per channel for said digitized information; said apparatus comprising data playback means for playing back said digitized information from respective data tracks; control playback means for playing back said control signal from said control track; and recovery means responsive to the played back control data for recovering the respective n channels of digitized information.

30. The apparatus of claim 29 wherein said recovery means includes multiplexing means having m inputs coupled to receive the digitized information reproduced from said m data tracks; n outputs for providing said n channels of digitized information; and switching means responsive to said control data for selectively coupling a respective one of said n outputs to successive predetermined ones of said inputs, thereby re-forming said n channels of digitized information.

31. The apparatus of claim 29 wherein each channel of digitized information represents a corresponding channel of analog signals, and wherein at least one of said m/n data tracks contains an emphasis identification signal identifying if said corresponding channel of analog signals had been emphasized prior to recording; and wherein said recovery means includes converting means for converting the respective channels of digitized information to analog signals and de-emphasis means for each channel and responsive to the reproduced emphasis identification signal of that corresponding channel for selectively de-emphasizing the converted analog signals.

32. Apparatus for recording n channels of digitized information on a record medium and for reproducing said n channels of digitized information therefrom, comprising:

data encoding means for encoding said digitized information in a predetermined encoding scheme;

demultiplexing means having n inputs and m outputs for distributing each channel of encoded digitized information to m/n respective outputs ($m \geqq n$ and m and n are integers);

data recording means coupled to said demultiplexing means for recording each channel of encoded digitized information in m/n respective data tracks on said record medium;

control signal generating means for generating a control signal including a control code representing at least the number of data tracks in which each channel of digitized information is recorded;

control recording means coupled to said control signal generating means for recording said control signal in a separate control track on said record medium;

data reproducing means for reproducing each channel of digitized information recorded in said respective m/n data tracks;

control reproducing means for reproducing said control signal from said control track;

multiplexing means having m inputs for receiving the digitized information reproduced from the respective data tracks, n outputs for providing n channels of digitized information, and switching means responsive to said control data for selectively coupling a respective one of sid n outputs to successive predetermined ones of said inputs, thereby recovering said n channels of digitized information; and data decoding means for decoding the respective channels of the encoded digitized information.

33. The apparatus of claim 32 wherein said control signal generating means includes error detecting code generating means for generating an error detecting code derived from said control data; and wherein said control reproducing means includes error detecting means responsive to the reproduced error detecting code for detecting if said control data is correct and, if so, for using said control code to control said multiplexing means.

34. The apparatus of claim 32 wherein said data encoding means includes analog-to-digital converting means for converting channels of analog signals into corresponding ones of said n channels of digitized information, said analog-to-digital converting means being operative to sample said analog signals at a selected sampling rate and to convert each sample to a digital representation thereof; said control signal generating means includes means for generating a sampling rate identification data for identifying said selected sampling rate, said sampling rate identification data being included as part of said control data: said control reproducing means is operative to reproduce said sampling rate identification data; and said data decoding means includes digital-to-analog converting means responsive to said reproduced sampling rate identification data to recover the original channels of analog signals.

35. The apparatus of claim 34 wherein said analog-to-digital converting means includes emphasis means for selectively emphasizing respective channels of said analog signals; said data encoding means further includes means for generating an emphasis identification signal for identifying if a respective channel of analog signals has been emphasized; said data recording means is operative to record said emphasis identification signal in at least one of the respective m/n data tracks; and said digital-to-analog converting means includes respective de-emphasis means responsive to the emphasis identification signal reproduced from said respective data track to selectively de-emphasize the respective channel of analog signals.

* * * * *